United States Patent
Tsukagoshi

(10) Patent No.: US 10,856,023 B2
(45) Date of Patent: Dec. 1, 2020

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/091,691

(22) PCT Filed: Apr. 11, 2017

(86) PCT No.: PCT/JP2017/014878
§ 371 (c)(1),
(2) Date: Oct. 5, 2018

(87) PCT Pub. No.: WO2017/179592
PCT Pub. Date: Oct. 19, 2017

(65) Prior Publication Data
US 2019/0166388 A1    May 30, 2019

(30) Foreign Application Priority Data
Apr. 12, 2016 (JP) ................. 2016-079891

(51) Int. Cl.
H04N 21/2365 (2011.01)
H04N 21/434 (2011.01)
(Continued)

(52) U.S. Cl.
CPC ......... H04N 21/2365 (2013.01); H04N 19/30 (2014.11); H04N 19/436 (2014.11);
(Continued)

(58) Field of Classification Search
None
See application file for complete search history.

(56) References Cited

U.S. PATENT DOCUMENTS

2003/0118097 A1   6/2003  Chen et al.
2006/0239343 A1  10/2006  Mohsenian
(Continued)

FOREIGN PATENT DOCUMENTS

JP       2008-543142 A     11/2008
WO   WO 2014/034463 A1     3/2014
(Continued)

OTHER PUBLICATIONS

International Search Report dated Jun. 27, 2017, in PCT/JP2017/014878, filed Apr. 11, 2017.
(Continued)

Primary Examiner — James R Marandi
(74) Attorney, Agent, or Firm — Oblon, McClelland, Maier & Neustadt, L.L.P.

(57) ABSTRACT

Synchronous acquisition of a plurality of pieces of image data on the reception side is provided. Each of the plurality of pieces of image data is encoded by an encoder to obtain a plurality of streams. A container of a predetermined format containing the plurality of streams is transmitted. A plurality of encoders performs encoding so as to achieve matching in display timings of corresponding pictures of the plurality of pieces of image data. Alternatively, the plurality of encoders inserts information for associating pictures with each other into each of encoded image data of corresponding pictures of the plurality of pieces of image data.

18 Claims, 26 Drawing Sheets

(51) Int. Cl.
    *H04N 21/242*     (2011.01)
    *H04N 21/43*      (2011.01)
    *H04N 19/30*      (2014.01)
    *H04N 19/436*     (2014.01)
    *H04N 21/44*      (2011.01)
    *H04N 19/70*      (2014.01)
    *H04N 21/8547*    (2011.01)

(52) U.S. Cl.
    CPC .......... *H04N 19/70* (2014.11); *H04N 21/242* (2013.01); *H04N 21/434* (2013.01); *H04N 21/4307* (2013.01); *H04N 21/44* (2013.01); *H04N 21/8547* (2013.01)

(56) References Cited

U.S. PATENT DOCUMENTS

| | | |
|---|---|---|
| 2007/0116117 A1 | 5/2007 | Tong et al. |
| 2011/0182365 A1 | 7/2011 | Mohsenian |
| 2015/0195587 A1 | 7/2015 | Tsukagoshi |
| 2015/0296248 A1 | 10/2015 | Tsukagoshi |
| 2016/0112724 A1* | 4/2016 | Hendry .............. H04N 21/2401 375/240.25 |
| 2016/0300335 A1* | 10/2016 | Guillotel ................ H04N 19/46 |
| 2017/0171563 A1 | 6/2017 | Deshpande |

FOREIGN PATENT DOCUMENTS

| | | |
|---|---|---|
| WO | WO 2014/080879 A1 | 5/2014 |
| WO | WO 2015/125489 A1 | 8/2015 |

OTHER PUBLICATIONS

Nakajima, N. et al., "Development of AVC/H.264 Super Hi-Vision Encoding Apparatus", Broadcast Engineering (Broadcasting Technology), vol. 60, No. 9, Sep. 1, 2007, 19 pages (with English translation).

Sano, T. et al., "Stereo Image Transmission System Using H.264 Software-Based HDTV Codec", Proceedings of the 2010 IEICE General Conference, Mar. 2, 2010, 8 pages (with English translation).

Extended European Search Report dated Jan. 15, 2019 in corresponding European Patent Application No. 17782405.9, 8 pages.

* cited by examiner

FIG. 5

| Syntax | Size | Type |
|---|---|---|
| Counter_Information SEI() { | | |
| profile | 8 | uimsbf |
| level | 8 | uimsbf |
| layer_id | 6 | uimsbf |
| max_temporal_id | 3 | uimsbf |
| reserved | 3 | 0x7 |
| stream_group_id | 4 | uimsbf |
| stream_id | 4 | uimsbf |
| dependency_type | 4 | uimsbf |
| Graphical_Data_Increment | 8 | uimsbf |
| } | | |

FIG. 6 semantics

| | |
|---|---|
| Profile (8bits) | PROFILE INFORMATION THAT LIMITS RANGE OF ENCODING TOOL. |
| Level (8bits) | LEVEL INFORMATION INDICATING SCALE OF ENCODING. |
| layer_id (6bits) | LAYER IDENTIFICATION INFORMATION. VALUE OTHER THAN "0" IS DEFINED IN CASE WHERE SCALABLE profile OF CODEC IS TO BE ADOPTED. |
| max_temporal_id (3bits) | MAXIMUM VALUE OF temporal_id IN CASE OF HIERARCHICAL ENCODING. |
| stream_group_id (4bits) | GROUP IDENTIFICATION INFORMATION OF STREAMS. (FOR EXAMPLE, GROUP IS BUNDLE OF STREAMS TO BE SYNCHRONOUSLY DISPLAYED) |
| stream_id (4bits) | IDENTIFICATION INFORMATION OF INDIVIDUAL STREAMS. |
| dependency_type (4bits) | DEPENDENCY RELATIONSHIP AMONG TRANSMISSION STREAMS ASSOCIATED WITH DECODED OUTPUT.<br>"0x0"   INDICATES THAT DECODED OUTPUT IS TO BE INDEPENDENTLY DISPLAYED<br>"0x1"   INDICATES THAT DECODED OUTPUT DEPENDS ON DECODED OUTPUT OF THIS VALUE OR BELOW. (COMBINED DISPLAY WITH OUTPUT '0x0' IS NECESSARY)<br>"0x2"   INDICATES THAT DECODED OUTPUT DEPENDS ON DECODED OUTPUT OF THIS VALUE OR BELOW. (COMBINED DISPLAY WITH OUTPUT '0x0' AND WITH OUTPUT '0x1' IS NECESSARY) |
| Graphical_Data_Increment (8bits) | COUNT-UP VALUE UPDATED FOR EACH OF pictures. |

FIG. 7

| Syntax | Size | Type |
|---|---|---|
| Multiple_stream_descriptor(){ | | |
|   descriptor_tag | 8 | uimsbf |
|   descriptor_length | 8 | uimsbf |
|     stream_group_id | 4 | uimsbf |
|     stream_id | 4 | uimsbf |
|     reserved | 4 | 0xf |
|     stream_content | 4 | uimsbf |
|     component_type | 8 | uimsbf |
|     profile | 8 | uimsbf |
|     level | 8 | uimsbf |
|     layer_id | 6 | uimsbf |
|     max_temporal_id | 3 | uimsbf |
|     dependency_type | 4 | uimsbf |
|      reserved | 3 | 0x7 |
|     num_of_corresponding_streams | 8 | uimsbf |
|     for ( I = 0; I < num_of_corresponding_streams ; I++ ) { | | |
|       stream_group_id | 4 | uimsbf |
|       corresponding_stream_id | 4 | uimsbf |
|       display_position | 4 | uimsbf |
|       position_offset | 4 | uimsbf |
|     } | | |
| } | | |

FIG. 8

| Field | Description |
|---|---|
| stream_group_id (4bits) | GROUP IDENTIFICATION OF STREAMS. (FOR EXAMPLE, BUNDLE OF STREAMS TO BE SYNCHRONOUSLY DISPLAYED) |
| stream_id (4bits) | STREAM IDENTIFICATION INFORMATION ASSOCIATED WITH THIS ES LOOP. |
| stream_content (4bits) | THIS INDICATES TYPE OF MEDIUM (VIDEO, AUDIO, SUBTITLE, OR THE LIKE) TO BE ENCODED AND MATCHES WITH DEFINITION OF component_descriptor. |
| component_type (8bits) | IDENTIFICATION INFORMATION OF ENCODING SCHEME DETERMINED FOR EACH OF MEDIA TYPES. IN CASE OF VIDEO, IT IS MPEG2video, AVC, HEVC, OR THE LIKE. |
| Profile (8bits) | PROFILE INFORMATION THAT LIMITS RANGE OF ENCODING TOOL. |
| Level (8bits) | LEVEL INFORMATION INDICATING SCALE OF ENCODING. |
| layer_id (6bits) | LAYER IDENTIFICATION INFORMATION. VALUE OTHER THAN '0' IS DEFINED IN CASE WHERE SCALABLE profile OF CODEC IS TO BE ADOPTED. |
| max_temporal_id (3bits) | MAXIMUM VALUE of temporal_id IN CASE OF HIERARCHICAL ENCODING. |
| dependency_type (4bits) | INDICATING DEPENDENCY RELATIONSHIP AMONG TRANSMISSION STREAMS ASSOCIATED WITH DECODED OUTPUT. <br> '0x0'' : INDICATES THAT DECODED OUTPUT IS TO BE INDEPENDENTLY DISPLAYED <br> '0x1'' : INDICATES THAT DECODED OUTPUT DEPENDS ON DECODED OUTPUT OF THIS VALUE OR BELOW. (COMBINED DISPLAY WITH OUTPUT '0x0' IS NECESSARY) <br> '0x2'' : INDICATES THAT DECODED OUTPUT DEPENDS ON DECODED OUTPUT OF THIS VALUE OR BELOW. (COMBINED DISPLAY WITH OUTPUT '0x0' AND WITH OUTPUT '0x1' IS NECESSARY) |
| num_of_corresponding_streams (8bits) | NUMBER OF STREAMS TO BE ASSOCIATED WITH OTHER THAN THIS ES LOOP |
| corresponding_stream_id (4bits) | IDENTIFICATION INFORMATION OF STREAM TO BE ASSOCIATED WITH OTHER THAN THIS ES LOOP. |
| Display_position (4bits) | INDICATING DISPLAY POSITION RELATIONSHIP OF COMBINED IMAGE WITH RESPECT TO INDEPENDENT DISPLAY <br> '0x0' : INDICATES SAME POSITION AS INDEPENDENT DISPLAY (MEANING COMBINED IMAGE IS DISPLAYED INSTEAD OF INDEPENDENT DISPLAY) <br> '0x1' : INDICATES E POSITION, '0x2' : INDICATES W POSITION, '0x3' : INDICATES N POSITION, '0x4' : INDICATES S POSITION, <br> '0x5' : INDICATES NE POSITION, '0x6' : INDICATES SW POSITION, '0x7' : INDICATES NW POSITION, and '0x8' : INDICATES SE POSITION |
| Position_offset (4bits) | INDICATING STAGE OF OFFSET WITH RESPECT TO INDEPENDENT POSITION. <br> '0x1' : OFFSET OF ONE STAGE, AND '0x2' : OFFSET OF TWO STAGES |

FIG. 9

Display_position

| NW POSITION | N POSITION | NE POSITION |
|---|---|---|
| W POSITION | Center<br>(INDEPENDENT POSITION) | E POSITION |
| SW POSITION | S POSITION | SE POSITION |

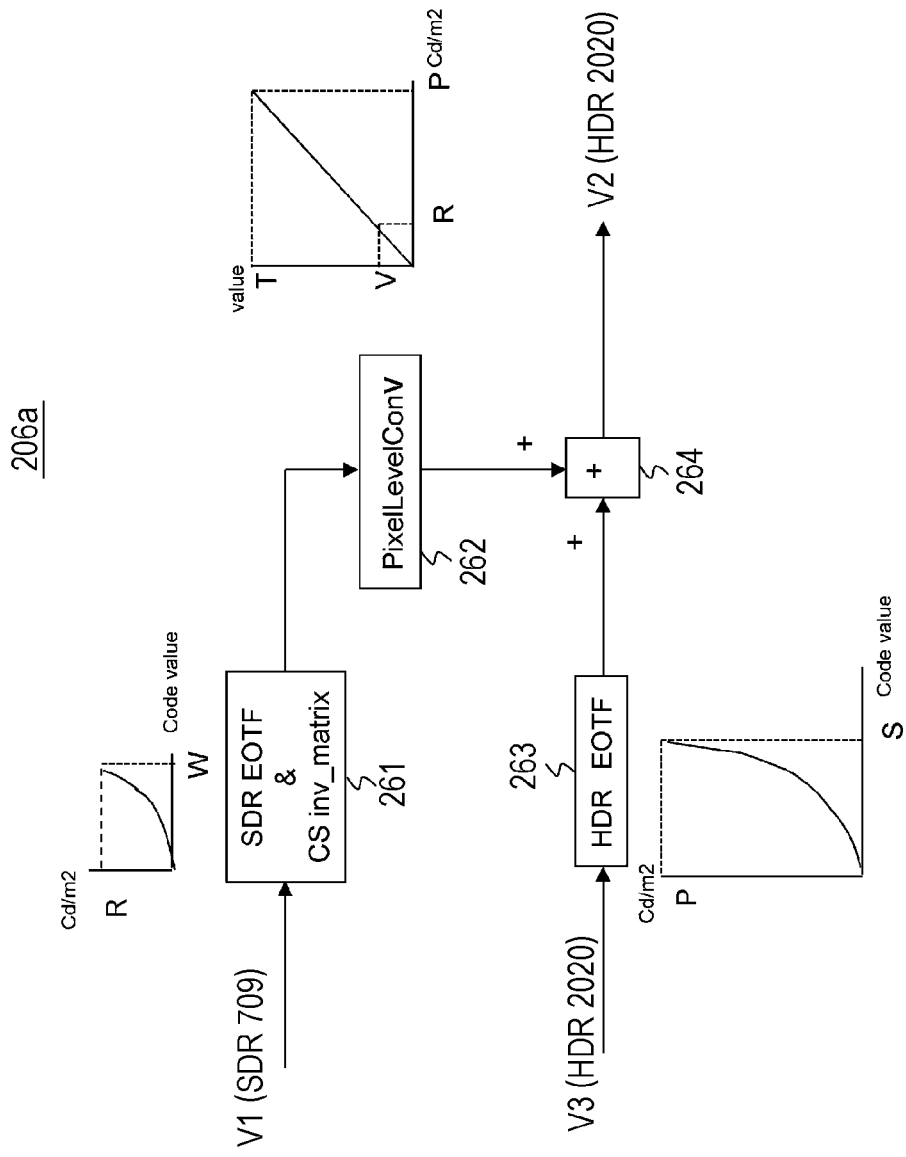

FIG. 19

CONTROL COMMAND AT GDI_Detector (a)

| Command_type | Semantics |
|---|---|
| Read | READ NEW PICTURE FROM BUFFER |
| Buffered | BUFFER AND WAIT FOR READING |
| Skip&Read | SKIP AND READ picture FROM BUFFER |
| Buffer Clear | EMPTY BUFFER (USED AT STARTUP OR RAP REPRODUCTION) |
| Wait | WAIT FOR BUFFER READING |

(b)

| Case | GDI Detection Input | Post_buf1 | Post_buf2 |
|---|---|---|---|
| 0 | GDI1 = GDI2 | Command1 = Read | Command2 = Read |
| 1 | GDI1 > GDI2 | Command1 = Read | Command2 = Skip&Read |
| 2 | GDI1 > GDI2 | Command1 = Buffered | Command2 = Wait |
| 3 | GDI1 < GDI2 | Command1 = Read | Command2 = Buffered |
| 4 | GDI1 < GDI2 | Command1 = Wait | Command2 = Buffered |

FIG. 20

IT IS RECOGNIZED THAT Post_buf1 PERFORMS BUFFERING OF IMAGE DATA TO BE INDEPENDENTLY DISPLAYED BY "dependency_type",
WHILE BUFFERS OTHER THAN Post_buf1 PERFORMS BUFFERING OF DATA ASSUMED TO BE COMBINED WITH AT LEAST IMAGE DATA TO BE
INDEPENDENTLY DISPLAYED BY "dependency_type".

Case 0:
GDI VALUE FOR QUEUE READING OF BOTH Post_buf MATCHES, LEADING TO READING FROM EACH OF Post_buf1 AND Post_buf2 IN ORDER OF QUEUE.   --- (1)

Case 1:
THIS CORRESPONDS TO CASE WHERE ACCUMULATION IN Post_buf1 PRECEDES ACCUMULATION IN Post_buf2.
ON CONDITION THAT DATA ACCUMULATION STATE OF QUEUE OF Post_buf2 IS NOT empty,
QUEUE OF Post_buf2 IS READ QUICKLY (BY Skip & Read), AND GDI VALUE IS MATCHED WITH QUEUE READING OF Post_buf1 TO PERFORM
READING FROM BOTH Post_bufs.

Case 2:
THIS CORRESPONDS TO CASE WHERE ACCUMULATION IN Post_buf1 PRECEDES ACCUMULATION IN Post_buf2.
WHEN DATA ACCUMULATION STATE OF QUEUE OF Post_buf2 IS empty (ACCUMULATED PIECES OF IMAGE DATA IS ONE OR LESS, IN THIS CASE),
QUEUE OF Post_buf2 IS NOT READ QUICKLY, WAIT FOR QUEUE READING OF Post_buf1 BY Buffering, AND   --- (2)
WAIT UNTIL MATCHING WITH GDI VALUE OF Post_buf2 IS ACHIEVED.
MUTUAL READING WITH Post_buf1 MAY BE PERFORMED AT EARLY STAGE BY PERFORMING PROCESSING OF Case 1
(THAT IS, QUICK READING OF Post_buf2) AT STAGE WHEN CERTAIN AMOUNT OF DATA IS STORED IN Post_buf2.

Case 3:
THIS CORRESPONDS TO CASE WHERE ACCUMULATION IN Post_buf2 PRECEDES ACCUMULATION IN Post_buf1.
WAIT FOR QUEUE READING OF Post_buf2 BY Buffering, AND GDI VALUE IS MATCHED WITH Post_buf1 TO PERFORM READING   --- (3)
FROM BOTH Post_bufs.

IN ANY CASE, IT IS ASSUMED TO HAVE QUEUE CAPACITY SUFFICIENT FOR Buffering.

FIG. 21

EXAMPLE OF CONTROL IN GDI_Detector (CASE WHERE QUEUE DEPTH IS FOUR STAGES)

(1)

| Timeslot | T1 | T2 | T3 | T4 |
|---|---|---|---|---|
| GDI 1 | 1 | 2 | 3 | 4 |
| GDI 2 | - | 1 | 2 | 3 |
| GDI 2'' (*) | 1 | 2 | 3 | 4 |
| command1 | Read | Read | Read | Read |
| command2 | Skip&Read | Read | Read | Read |

(2)

| Timeslot | T1 | T2 | T3 | T4 |
|---|---|---|---|---|
| GDI 1 | 1 | 2 | 3 | 4 |
| GDI 2 | - | - | - | 1 |
| GDI 1' (+) | - | - | - | 1 |
| command1 | Buffered | Buffered | Buffered | Read |
| command2 | Wait | Wait | Wait | Read |

(3)

| Timeslot | T1 | T2 | T3 | T4 |
|---|---|---|---|---|
| GDI 1 | - | 1 | 2 | 3 |
| GDI 2 | 1 | 2 | 3 | 4 |
| GDI 2' (+) | - | 1 | 2 | 3 |
| command1 | - | Read | Read | Read |
| command2 | Buffered | Read | Read | Read |

IN CASE WHERE GDI VALUE IS NONE AND REPRESENTED BY "-", COMPARISON IS PERFORMED AS VALUE ZERO.
(+) GDI 1': QUEUE OF GDI 1 IS Buffered, AND PERFORM IMAGE DATA READING
  GDI 2': QUEUE OF GDI 2 IS Buffered, AND PERFORM IMAGE DATA READING
(*) GDI 2'': QUEUE OF GDI 2 IS picture-SKIPPED, AND PERFORM QUICK READING

TRANSMISSION APPARATUS, TRANSMISSION METHOD, RECEPTION APPARATUS, AND RECEPTION METHOD

TECHNICAL FIELD

The present technology relates to a transmission apparatus, a transmission method, a reception apparatus and a reception method, and particularly relates to a transmission apparatus or the like that encodes and transmits each of a plurality of pieces of image data.

BACKGROUND ART

Conventionally, there is a known technique of transmitting high quality format image data together with low quality format image data and then selectively using either the low quality format image data or high quality format image data on the reception side. For example, Patent Document 1 describes a method of scalably performing media encoding to generate a stream of a base layer for a low resolution video service and a stream of an enhancement layer for a high resolution video service and transmitting a broadcast signal including these streams. Note that high quality formats include a high dynamic range, UHD resolution, and the like.

CITATION LIST

Patent Document

Patent Document 1: Japanese Patent Application Laid-Open No. 2008-543142

SUMMARY OF THE INVENTION

Problems to be Solved by the Invention

The purpose of present technology is to enable synchronous acquisition of a plurality of pieces of image data on the reception side.

Solutions to Problems

A concept of present technology is
a transmission apparatus including:
a plurality of encoders that encodes each of a plurality of pieces of image data to obtain a plurality of streams; and
a transmission unit that transmits a container of a predetermined format containing the plurality of streams,
in which the plurality of encoders performs encoding so as to achieve matching in display timings of corresponding pictures of the plurality of pieces of image data.

In the present technology, each of a plurality of pieces of image data is encoded by a plurality of encoders to obtain a plurality of streams. A container of a predetermined format containing a plurality of streams is transmitted by the transmission unit. Examples of formats of the container include MPEG-2 transport stream (MPEG-2 TS), ISO base media file format (ISOBMFF) and MPEG media transport (MMT).

Here, a plurality of pieces of image data is encoded so as to achieve matching in display timings of corresponding pictures. For example, it is allowable to configure such that either a hypothetical reference decoder (HRD) parameter or a picture encode count value reset by intra-picture is supplied from one of the plurality of encoders to another encoder, or alternatively a common HRD parameter is externally supplied to the plurality of encoders.

In this manner, according to the present technology, a plurality of pieces of image data is encoded to achieve matching in display timings of corresponding pictures. Therefore, this enables synchronous acquisition of a plurality of pieces of image data on the reception side.

Note that the present technology may be configured, for example, such that the plurality of encoders includes: a first encoder that encodes first image data to obtain a first stream; and a second encoder that encodes a third image data obtained on the basis of the first image data and a second image data associated with the first image data to obtain a second stream, and the transmission unit may transmit a container of the predetermined format containing the first stream and the second stream. In this case, for example, it is allowable to further include a processing unit configured to process the second image data to obtain the first image data, obtain the third image data on the basis of the first image data and the second image data, and output the first image data and the third image data.

Furthermore, in this case, for example, the second image data may be image data of high quality format, the first image data may be image data of low quality format obtained by processing the second image data, and the third image data may be image data obtained as a difference between the second image data and the first image data. Then, in this case, the second image data may be image data of a high dynamic range and the first image data may be image data of a normal dynamic range, or alternatively, the second image data may be image data of UHD resolution and the first image data may be image data of HD resolution.

Furthermore, another concept of the present technology is
a reception apparatus including
a reception unit that receives a container of a predetermined format including a plurality of streams obtained by encoding each of a plurality of pieces of image data,
the plurality of pieces of image data being encoded so as to achieve matching in display timings of corresponding pictures, and
the reception apparatus further including
a control unit that controls decode processing of decoding the plurality of streams to obtain the plurality of pieces of image data and controls processing using the plurality of pieces of image data.

According to the present technology, the reception unit receives a container of a predetermined format containing a plurality of streams obtained by encoding each of the plurality of pieces of image data. Here, the plurality of pieces of image data is encoded to achieve matching in display timings of corresponding pictures. The control unit controls decode processing of decoding a plurality of streams to obtain a plurality of pieces of image data and controls processing using the plurality of pieces of image data.

In this manner, according to the present technology, the plurality of pieces of image data is encoded so as to achieve matching in display timings of corresponding pictures, enabling the plurality of pieces of image data obtained by the decode processing to be synchronous. Therefore, this makes it possible to satisfactorily perform processing (combining processing, display processing, or the like) using the plurality of pieces of image data.

Note that in the present technology, for example, the container may include a first stream obtained by encoding the first image data and may include a second stream obtained by encoding third image data obtained on the basis of the first image data and the second image data associated with the first image data, the decode processing may decode the first stream to obtain the first image data and may decode the second stream to obtain the third image data, and the processing using the plurality of pieces of image data may obtain the second image data on the basis of the first image data and the third image data.

Furthermore, another concept of present technology is
a transmission apparatus including:
a plurality of encoders that encodes each of a plurality of pieces of image data to obtain a plurality of streams; and
a transmission unit that transmits a container of a predetermined format containing the plurality of streams,
in which each of the plurality of encoders inserts information for associating pictures with each other into encoded image data of corresponding pictures of the plurality of pieces of image data.

In the present technology, each of a plurality of pieces of image data is encoded by a plurality of encoders to obtain a plurality of stream. A container of a predetermined format containing a plurality of streams is transmitted by the transmission unit. Examples of formats of the container include MPEG-2 transport stream (MPEG-2 TS), ISO base media file format (ISOBMFF) and MPEG media transport (MMT).

Here, information for associating pictures with each other is inserted into encoded image data of corresponding pictures of the plurality of pieces of image data. For example, the information for associating the pictures with each other may be a count-up value updated for each of pictures.

In this manner, in the present technology, information for associating pictures with each other is inserted into encoded image data of a corresponding picture of a plurality of pieces of image data.

Therefore, it is possible on the reception side to easily obtain a plurality of pieces of image data synchronously on the basis of information for associating pictures of each other.

Note that the present technology may include, for example, as the plurality of encoders: a first encoder that encodes first image data to obtain a first stream; and a second encoder that encodes a third image data obtained on the basis of the first image data and a second image data associated with the first image data to obtain a second stream, in which the transmission unit may transmit a container of a predetermined format containing the first stream and the second stream. In this case, for example, it is allowable to further include a processing unit configured to process the second image data to obtain the first image data, obtain the third image data on the basis of the first image data and the second image data, and output the first image data and the third image data.

Furthermore, in this case, for example, the second image data may be image data of high quality format, the first image data may be image data of low quality format obtained by processing the second image data, and the third image data may be image data obtained as a difference between the second image data and the first image data. Then, in this case, the second image data may be image data of a high dynamic range and the first image data may be image data of a normal dynamic range, or alternatively, the second image data may be image data of UHD resolution and the first image data may be image data of HD resolution.

Furthermore, another concept of the present technology is
a reception apparatus including
a reception unit that receives a container of a predetermined format containing a plurality of streams obtained by encoding each of a plurality of pieces of image data,
information for associating pictures with each other being inserted into encoded image data of a corresponding picture of the plurality of pieces of image data, and
the reception apparatus further including
a control unit that controls decode processing of decoding the plurality of streams to obtain the plurality of pieces of image data, controls image data processing using the plurality of pieces of image data, and controls to enable the plurality of pieces of image data used in the image data processing to be synchronous on the basis of the information for associating pictures with each other.

According to the present technology, the reception unit receives a container of a predetermined format containing a plurality of streams obtained by encoding each of the plurality of pieces of image data. Here, information for associating pictures with each other is inserted into encoded image data of a corresponding picture of the plurality of pieces of image data. The control unit controls the decode processing of decoding a plurality of streams to obtain a plurality of pieces of image data, controls the image data processing using the plurality of pieces of image data, and controls so as to enable the plurality of pieces of image data used in the image data processing on the basis of the information for associating pictures with each other.

In this manner, in the present technology, the plurality of pieces of image data used in the image data processing is synchronous on the basis of information for associating pictures with each other. Therefore, this makes it possible to satisfactorily perform processing (combining processing, display processing, or the like) using the plurality of pieces of image data.

Note that in the present technology, for example, the container may include a first stream obtained by encoding the first image data and may include a second stream obtained by encoding third image data obtained on the basis of the first image data and the second image data associated with the first image data, the decode processing may decode the first stream to obtain the first image data and may decode the second stream to obtain the third image data, and the processing using the plurality of pieces of image data may obtain the second image data on the basis of the first image data and the third image data.

Effects of the Invention

According to present technology, it is possible to obtain a plurality of pieces of image data synchronously on the reception side. Note that effects described here in the present specification are provided for purposes of exemplary illustration and are not intended to be limiting. Still other additional effects may also be contemplated.

BRIEF DESCRIPTION OF THE DRAWINGS

FIG. 5 is a diagram illustrating a structure example of a counter information SEI message.

FIG. 6 is a diagram illustrating content of main information in a structure example of a counter information SEI message.

FIG. 7 is a diagram illustrating a structure example of a multiple stream descriptor.

FIG. 8 is a diagram illustrating content of main information in a structure example of a multiple stream descriptor.

FIG. 9 is a diagram for illustrating a display position.

FIG. 18 is a diagram for illustrating details of inverse processing in a post processor of a reception apparatus.

FIG. 19 is a diagram illustrating the types and content of control commands transmitted from a GDI detector to a post buffer.

FIG. 20 is a diagram for illustrating synchronization processing in each of cases that may occur in comparison of count-up values.

FIG. 21 is a diagram illustrating a control example in the GDI detector.

MODE FOR CARRYING OUT THE INVENTION

Hereinafter, embodiments of the present invention (hereinafter, embodiment(s)) will be described. Note that the description will be presented in the following order.

1. First Embodiment
2. Second Embodiment
3. Modification

1. First Embodiment

[Exemplary Configuration of Transmission-Reception System]

Figure 1:
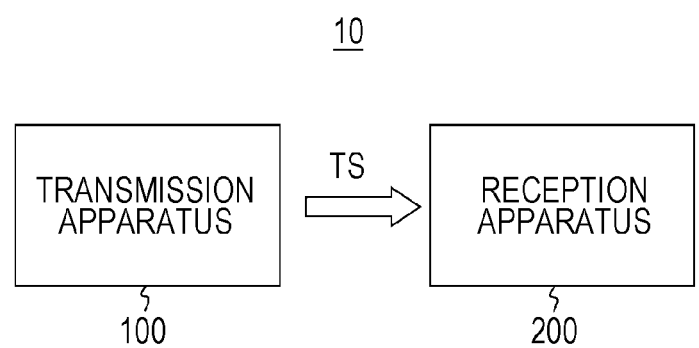
FIG. 1 is a block diagram illustrating an exemplary configuration of a transmission-reception system according to a first embodiment.

FIG. 1 illustrates an exemplary configuration of a transmission-reception system 10 according to a first embodiment. The transmission-reception system 10 includes a transmission apparatus 100 and a reception apparatus 200.

The transmission apparatus 100 transmits an MPEG-2 transport stream (hereinafter simply referred to as "transport stream TS") as a container stream (multiplexed stream) on broadcast waves or packets on a network. The transport stream TS includes two video streams, namely, a first stream and a second stream.

The first stream is a video stream obtained by encoding the first image data with HEVC, AVC or the like. The second stream is a video stream obtained by encoding, with HEVC, AVC or the like, the third image data obtained on the basis of the first image data and the second image data associated with the first image data.

In the present embodiment, the second image data is image data of high quality format (image data of high dynamic range (HDR) or image data of UHD resolution), the first image data is image data of low quality format (image data of a normal dynamic range (SDR) or image data of HD resolution), and the third image data is image data obtained as a difference between the second image data and the first image data.

In encoding the first image data and the third image data, the transmission apparatus 100 adopts a first method or a second method in order to enable the reception side to obtain corresponding pictures of the first image data and the third image data at the same timing.

In the case of adopting the first method, the first image data and the third image data are encoded to achieve matching in display timings of corresponding pictures. For example, when an encoder for encoding each of the first image data and the third image data is defined as a first encoder and a second encoder, respectively, a hypothetical reference decoder (HRD) parameter is supplied from one to the other of the encoders. Alternatively, a common HRD parameter is externally supplied to the first encoder and the second encoder.

With the HRD parameter supplied in this manner, it is possible to perform buffer delay control in the first encoder and the second encoder in a same manner, enabling encoding of the first image data and the third image data to achieve matching in display timings of corresponding pictures. Note that picture encode count values reset by intra-picture may be supplied instead of HRD parameters from one to the other of the first encoder and the second encoder so as to enable the picture encode count value to be shared by both encoders.

Furthermore, in the case of adopting the second method, information for associating mutual pictures with each other is inserted into the encoded image data of the corresponding picture of the first image data and the third image data. In the present embodiment, the information for associating mutual pictures with each other is defined as a count-up value updated for each of pictures.

The reception apparatus 200 receives the transport stream TS transmitted from the transmission apparatus 100 over broadcast waves or packets on a network. The transport stream TS includes the first stream and the second stream as described above.

In a case where the reception apparatus 200 supports low quality format alone, the reception apparatus 200 extracts the first stream from the transport stream TS and decodes it to obtain the first image data of low quality format, and performs processing such as display processing by the first image data (image data of a normal dynamic range or image data of HD resolution).

Furthermore, in a case where the reception apparatus 200 supports high quality format, the reception apparatus 200 extracts both the first stream and the second stream from the transport stream TS, decodes the first stream and the second stream by a decoder to obtain the first image data and the third Image data, respectively. Here, in a case where the first method is adopted on the transmission side, the first image data and the third image data are obtained synchronously, that is, the corresponding pictures are obtained at the same timing. In contrast, in a case where the second method is adopted on the transmission side, the corresponding pictures of the first image data and the third image data might not be synchronous. Therefore, the first image data and the third image data are set to a synchronized state on the basis of information for associating mutual pictures with each other.

The reception apparatus 200 obtains second image data of high quality format on the basis of the first image data and the third image data in a synchronized state, and performs processing such as display processing by the second image data (image data of a high dynamic range or image data with UHD resolution).

<Exemplary Configuration of Transmission Apparatus>

Figure 2:
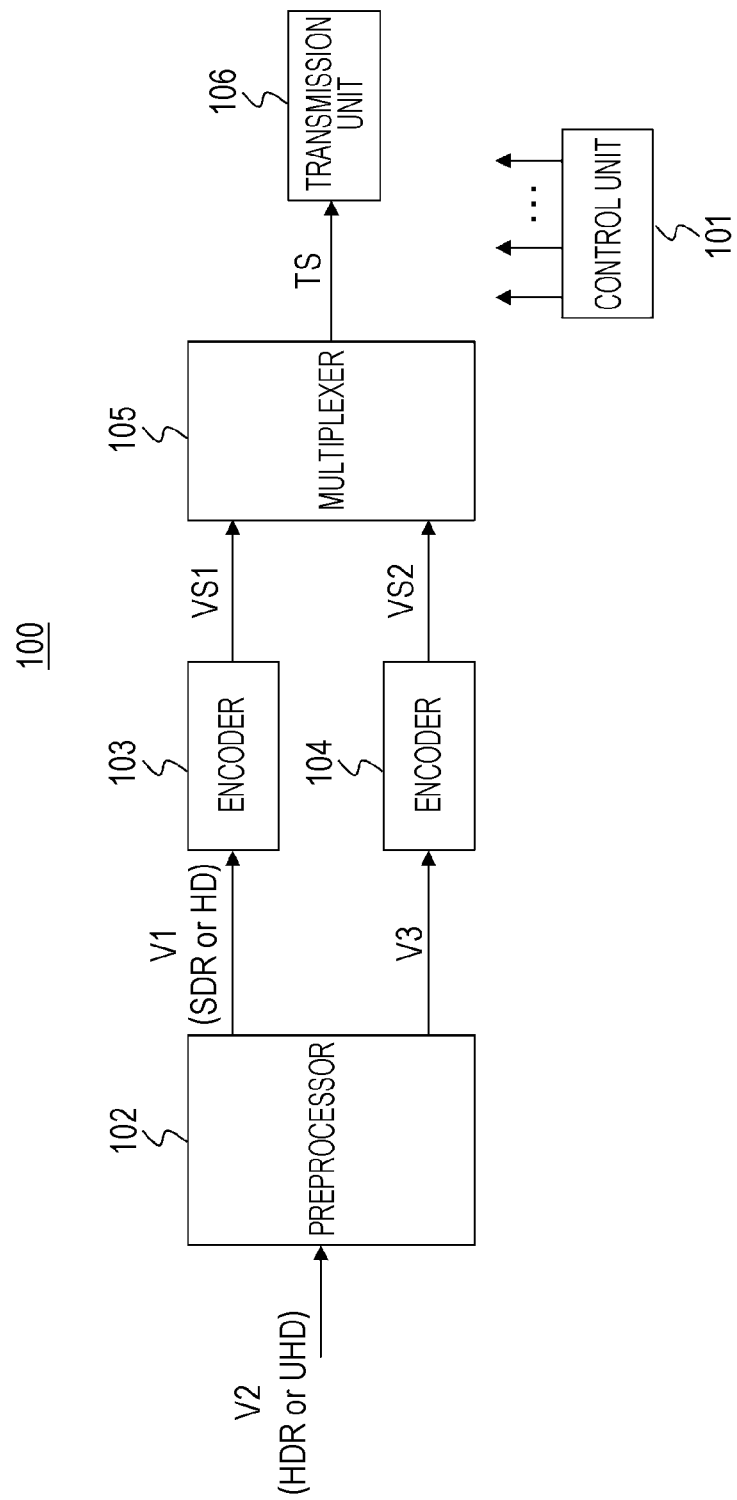
FIG. 2 is a block diagram illustrating an exemplary configuration of a transmission apparatus forming a transmission-reception system.

FIG. 2 illustrates an exemplary configuration of the transmission apparatus 100. The transmission apparatus 100 includes a control unit 101, a preprocessor 102, an encoder 103, an encoder 104, a multiplexer 105, and a transmission unit 106. The control unit 101 includes a central processing unit (CPU), and controls operation of individual portions of the transmission apparatus 100 on the basis of a control program.

The preprocessor 102 processes image data (second image data) V2 of high quality format to obtain image data (first image data) V1 of low quality format, and then, obtains difference image data (third image data) V3 on the basis of the image data V1 and the image data V2, and outputs the image data V1 and V3. For example, while there are two cases, that is, where the image data V2 is image data of a high dynamic range and the image data V1 is image data of a normal dynamic range, and where the image data V2 is image data of UHD resolution and the image data V1 is image data of HD resolution, the present invention is not limited thereto.

Figure 3:
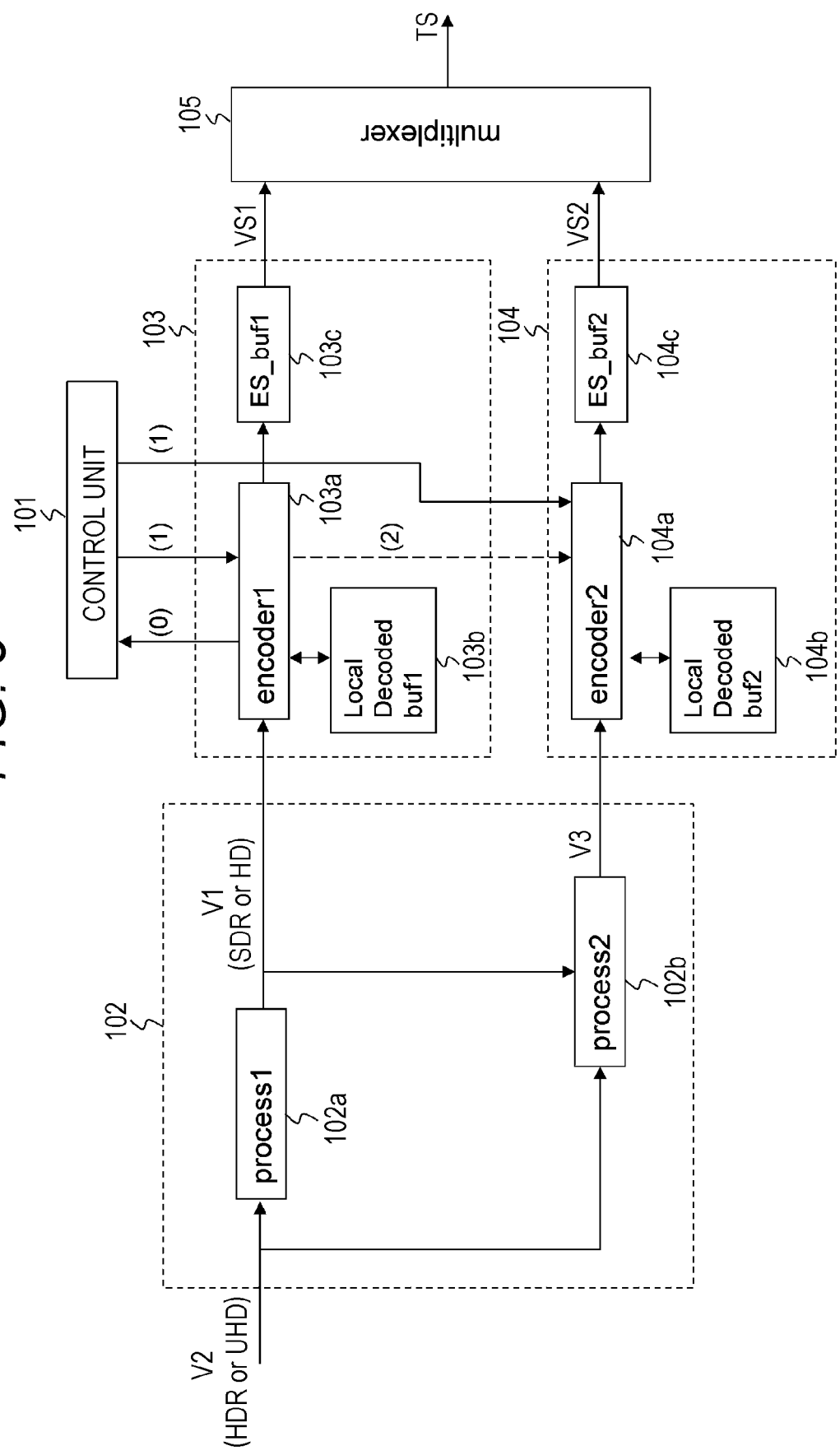
FIG. 3 is a diagram for illustrating a detailed configuration of a preprocessor and an encoder.
Figure 4:
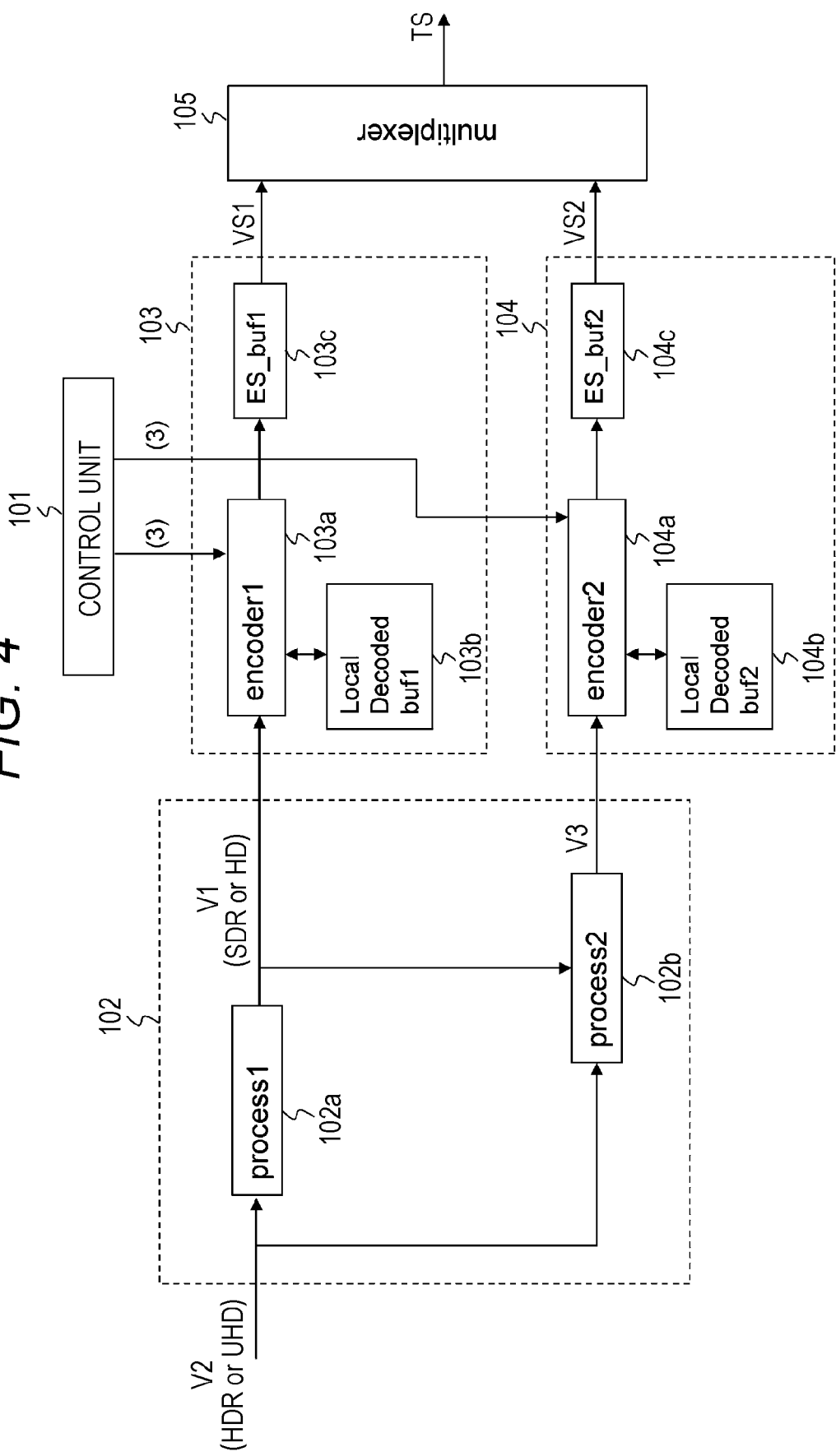
FIG. 4 is a diagram for illustrating a detailed configuration of a preprocessor and an encoder.

As illustrated in FIGS. 3 and 4, the preprocessor 102 includes a processing unit (process 1) 102a and a processing unit (process 2) 102b. The image data V2 of the high quality format is supplied to the processing unit 102a. The processing unit 102a converts the image data V2 into image data V1 of low quality format, and then outputs the image data V1.

Furthermore, the image data V2 of high quality format is supplied to the processing unit 102b, and together with this, the image data V1 of low quality format obtained by the processing unit 102a is supplied to the processing unit 102b. The processing unit 102b obtains the image data V3 of as a difference between the image data V2 and the image data V1, and then outputs the image data V3.

Returning to FIG. 2, the encoder 103 encodes the image data V1 output from the preprocessor 102 to obtain a video stream (first stream) VS1. As illustrated in FIGS. 3 and 4, the encoder 103 includes an encoding unit (encoder 1) 103a, a local decoded buffer (Local decoded buf 1) 103b, an elementary stream buffer (ES_buf 1) 103c, and the like.

The image data V1 obtained by the preprocessor 102 is supplied to the encoding unit 103a. The encoding unit 103a encodes the image data V1 with HEVC, AVC, or the like, to obtain a video stream VS1. The local decoded buffer 103b temporarily accumulates decoding results of the encoded image data of each of pictures obtained by encoding by the encoding unit 103a and enables reference to the decoding result in the encoding unit 103a. Furthermore, the elementary stream buffer 103c temporarily accumulates and outputs the encoded image data of each of pictures constituting the video stream VS1 obtained by the encoding unit 103a.

Furthermore, returning to FIG. 2, the encoder 104 encodes the image data V3 output from the preprocessor 102 to obtain a video stream (second stream) VS2. As illustrated in FIGS. 3 and 4, the encoder 104 includes an encoding unit (encoder 12) 104a, a local decoded buffer (Local decoded buf 2) 104b, an elementary stream buffer (ES_buf 2) 104c, and the like.

The image data V3 obtained by the preprocessor 102 is supplied to the encoding unit 104a. The encoding unit 104a encodes the image data V3 with HEVC, AVC, or the like, to obtain a video stream VS2. The local decoded buffer 104b temporarily accumulates decoding results of the encoded image data of each of pictures obtained by encoding by the encoding unit 104a and enables reference to the decoding result in the encoding unit 104a. Furthermore, the elementary stream buffer 104c temporarily accumulates and outputs the encoded image data of each of pictures constituting the video stream VS2 obtained by the encoding unit 104a.

Returning to FIG. 2, it is assumed that the encoder 103 and the encoder 104 can independently determine the encoded picture type without consideration of dependency between the encoders. While the image data V1 is encoded by the encoder 103 and the image data V3 is encoded by the encoder 104, either the first method or the second method is adopted as described above in order to enable synchronous acquisition of these two pieces of image data V1 and V3 on the reception side.

In the case of adopting the first method, the encoder 103 and the encoder 104 encode the image data V1 and the image data V3 respectively to achieve matching in display timings of corresponding pictures. For example, an HRD parameter is supplied from the encoding unit 103a as a master to the encoding unit 104a as a slave on a path indicated by (2) of FIG. 3. With this configuration, the HRD parameters are shared by the encoder 103 (encoding unit 103a) and the encoder 104 (encoding unit 104a).

Note that when the relationship between the master and the slave is reversed, the HRD parameter may be supplied from the encoding unit 104a to the encoding unit 103a. Furthermore, instead of supplying the HRD parameter directly from one encoder to the other encoder, it may be supplied via the control unit 101.

Furthermore, for example, the HRD parameter shared by the encoding unit 103a and the encoding unit 104a is supplied from the control unit 101 via the path indicated by (1) of FIG. 3. With this configuration, the HRD parameters are shared by the encoder 103 (encoding unit 103a) and the encoder 104 (encoding unit 104a). In this case, for example, scene detection information is supplied from the encoding unit 103a to the control unit 101 via a path indicated by (0) of FIG. 3. For example, HRD parameters supplied from the control unit 101 to individual encoders are reset at the time of encoding startup, group picture start, scene detection, or the like.

In this manner, the encoder 103 and the encoder 104 share the HRD parameter, enabling the buffer delay control of these two encoders to be performed in a same manner. Accordingly, the encoder 103 and the encoder 104 encode the image data V1 and the image data V3 respectively to achieve matching in display timings of corresponding pictures.

Buffer delay control will now be described. Buffer management of the encoder can be performed by a hypothetical reference decoder (HRD) model. At that time, in order to equalize the encoding delays of the encoding unit (encoder 1) 103a and the encoding unit (encoder 2) 104a, the values of "initial_cpb_removal_delay", "cpb_removal_delay", and "dpb_output_delay", as HRD parameters, are set to a same value.

"initial_cpb_removal_delay" indicates a delay time from a point of starting accumulation of the first encoded picture of a sequence in the elementary stream buffer (ES_buf) at the decoder to a point where the picture is extracted by the decoder, that is, the picture is decoded. "cpb_removal_delay" indicates a delay time from the entry of the first encoded byte of the picture in the elementary stream buffer (ES_buf) at the decoder to a point where the picture is extracted from the decoder. "dpb_output_delay" indicates a delay time from the entry of a decoded picture into the decoded buffer (Decoded_buf) to a point where the picture is drawn out for display.

When the HRD parameters ("initial_cpb_removal_delay", "cpb_removal_delay", "dpb_output_delay") are the same among the encoders, the display output from the decoder will also be the same. Since the time stamps of PTS and DTS added to the PES packet in the multiplexer 105 are generated with reference to the HRD parameters, timing management of the system is performed in a similar manner.

Note that instead of supplying the HRD parameter from one encoder to the other, a picture encoding count value to be reset in the intra-picture may be supplied and the picture encode count value may be shared by the two encoders. This picture encode count value corresponds to "frame_num" in AVC and HEVC.

Even in a case where the picture encode count value is shared by the encoder 103 and the encoder 104 in this manner, the buffer delay control of these two encoders is also performed in a same manner. Accordingly, the encoder 103 and the encoder 104 encode the image data V1 and the image data V3 respectively to achieve matching in display timings of corresponding pictures.

In contrast, in a case where the second method is adopted, the encoder 103 and the encoder 104 insert information for associating pictures with each other into the encoded image data of the corresponding pictures of the image data V1 and the image data V3. For example, a count-up value "Graphical_Data_Increment" to be updated for each of pictures is commonly supplied from the control unit 101 to the encoding unit 103a and the encoding unit 104a via the path indicated by (3) of FIG. 4, and the same count-up value "Graphical_Data_Increment" is inserted into the encoded image data of the corresponding pictures of the image data V1 and the image the data V3.

Specifically, the encoder 103 (the encoding unit 103a) and the encoder 104 (the encoding unit 104a) individually insert newly defined counter information SEI message (Counter_Information SEI message) having information "Graphical_Data_Increment" into a portion of "Suffix_SEIs" of the access unit (AU), for example.

FIG. 5 illustrates a structure example (Syntax) of a counter information SEI message. FIG. 6 illustrates content (Semantics) of main information in the structure example. The 8-bit field of "profile" illustrates the profile information that limits a range of an encoding tool. The 8-bit field of "Level" indicates level information indicating the scale of encoding. The 6-bit field of "layer_id" indicates layer identification information, to which a value other than "0" is defined in a case where a scalable profile of the codec is to be adopted.

The 3-bit field of "max_temporal_id" indicates a maximum value of a temporal ID (temporal_id) in the case of hierarchical encoding. The 4-bit field "stream_group_id" indicates group identification information for identifying a group of streams. For example, a group of streams is a bundle of streams to be synchronously displayed. The 4-bit field of "stream_id" indicates stream identification information for identifying individual streams.

The 4-bit field of "dependency_type" indicates a dependency type which is a dependency relationship among transmission streams regarding decoded output. "0x0" indicates that the decoded output is to be independently displayed. "0x1" indicates that the decoded output depends on the decoded output of this value or below and that a combined display with the output "0x0" is necessary. "0x2" indicates that the decoded output depends on the decoded output of this value or below this value and that a combined display with the decoded output of "0x0", "0x1" is necessary.

The 8-bit field of "Graphical_Data_Increment" indicates a count-up value updated for each of pictures. As described above, this count-up value constitutes information for associating corresponding pictures of a plurality of pieces of image data.

Returning to FIG. 2, the multiplexer 105 converts the video streams VS1 and VS2 respectively generated by the encoders 103 and 104 into PES packets, further converts them into transport packets, and multiplexes them to obtain a transport stream TS as a multiplexed stream. Furthermore, the multiplexer 105 inserts stream information corresponding to each of the video streams VS1 and VS2 into the layer of the transport stream TS.

The multiplexer 105 inserts this stream information as a multiple stream descriptor to be newly defined (Multiple_stream_descriptor) into a video elementary stream loop arranged corresponding to each of video streams under the program map table.

FIG. 7 illustrates a structure example (Syntax) of a multiple stream descriptor. Furthermore, FIG. 8 illustrates content (Semantics) of main information in the structure example. The 8-bit field of "descriptor_tag" indicates the type of the descriptor. Here, this indicates a multiple stream descriptor. The 8-bit field of "descriptor_length" indicates the length (size) of the descriptor and indicates the subsequent byte length as the length of the descriptor.

The 4-bit field "stream_group_id" indicates group identification information for identifying a group of streams. For example, a group of streams is a bundle of streams to be synchronously displayed. A 4-bit field of "stream_id" indicates stream identification information associated with this ES loop.

The 4-bit field of "stream_content" indicates the type of the medium (video, audio, subtitle, or the like) to be encoded, and matches with the definition of the component descriptor. The 8-bit field "component_type" indicates the identification information of the encoding scheme determined for each of media types. In the case of video, it is MPEG 2 video, AVC, HEVC, or the like.

The 8-bit field of "profile" illustrates the profile information that limits a range of an encoding tool. The 8-bit field of "Level" indicates level information indicating the scale of encoding. The 6-bit field of "layer_id" indicates layer identification information, to which a value other than "0" is defined in a case where a scalable profile of the codec is to be adopted. The 3-bit field of "max_temporal_id" indicates a maximum value of a temporal ID (temporal_id) in the case of video time hierarchical encoding.

The 4-bit field of "dependency_type" indicates a dependency_type which is a dependency relationship among transmission streams regarding decoded output. "0x0" indicates that the decoded output is to be independently displayed. "0x1" indicates that the decoded output depends on the decoded output of this value or below and that a combined display with the output "0x0" is necessary. "0x2" indicates that the decoded output depends on the decoded output of this value or below this value and that a combined display with the decoded output of "0x0", "0x1" is necessary.

The 8-bit field of "num_of_corresponding_streams" indicates the number of streams to be associated with other than its own ES loop. The 4-bit field of "stream_group_id" and the 4-bit field of "corresponding_stream_id", the 4-bit field of "display_position" and the 4-bit field of "position_offset" are repeated the number of times represented by this number. The "stream_group_id" field indicates group identification information for identifying a group of streams. The "corresponding_stream_id" field indicates identification information of the stream to be associated with other than this ES loop.

The "display_position" field indicates a display position relationship of a combined image with respect to the independent display. For example, "0x0" indicates the same position as the independent display (meaning a combined image is displayed instead of the independent display). "0x1" indicates an E position, "0x2" indicates a W position, "0x3" indicates an N position, "0x4" indicates an S position, "0x5" indicates an NE position, "0x6" indicates an SW position, "0x7" indicates an NW position, and 0x8 "indicates an SE position. FIG. 9 illustrates an example of individual preset positions. The "position_offset" field indicates a stage of an offset with respect to the independent position. For example, "0x1" indicates an offset of one stage, and "0x2" indicates an offset of two stages.

Note that the "num_of_corresponding_streams" field indicates the number of streams to be associated other than its own ES loop. The "num_of_corresponding_streams" field, however, may indicate the number of associated streams including its own ES loop. In that case, after "num_of_corresponding_streams", information on the stream associated with its own ES loop is also included, in which case "corresponding_stream_id" has a value that matches "stream_group_id".

Returning to FIG. 2, the transmission unit 106 transmits the transport stream TS obtained by the multiplexer 105 over the broadcast waves or packets in a network to the reception apparatus 200.

Operation of the transmission apparatus 100 illustrated in FIG. 2 will be briefly described. The image data V2 of high quality format (image data of high dynamic range or image data of UHD resolution) is supplied to the preprocessor 102. The preprocessor 102 performs conversion processing on the image data V2 to obtain low quality format image data V1 (image data of a normal dynamic range or image data of HD resolution). Furthermore, the preprocessor 102 further obtains the image data V3 as a difference between the image data V2 and the image data V1. In an output stage of the preprocessor 102, the corresponding pictures of the image data V1 and the image data V3 are synchronous.

The image data V1 output from the preprocessor 102 is supplied to the encoder 103. The encoder 103 encodes the image data V1 with HEVC, AVC or the like to obtain the video stream VS1. Furthermore, the image data V3 output from the preprocessor 102 is supplied to the encoder 104. The encoder 104 encodes the image data V3 with HEVC, AVC or the like to obtain the video stream VS2.

In this case, the first method or the second method is adopted to enable synchronous acquisition of corresponding pictures of the image data V1 and V3 on the reception side.

In a case where the first method is adopted, the encoder 103 and the encoder 104 encode the image data V1 and the image data V3 respectively to achieve matching in display timings of corresponding pictures. In this case, the encoder 103 and the encoder 104 share an HRD parameter and a picture encode count value.

Furthermore, in a case where the second method is adopted, each of the encoder 103 and the encoder 104 inserts a count-up value "Graphical_Data_Increment" updated for each of pictures as information for associating the pictures with each other into the encoded image data of the corresponding pictures of the image data V1 and the image data V3. In this case, the counter information SEI message (refer to FIG. 5) having the count-up value "Graphical_Data_Increment" is inserted in the encoded image data.

The video streams VS1 and VS2 respectively obtained by the encoders 103 and 104 are supplied to the multiplexer 105. The multiplexer 105 converts the video streams VS1 and VS2 into PES packets, further converts them into transport packets, and multiplexes them to obtain a transport stream TS as a multiplexed stream.

Furthermore, the multiplexer 105 inserts stream information corresponding to each of the video streams VS1 and VS2 into the layer of the transport stream TS. In this case, a multiple stream descriptor (refer to FIG. 7) having stream information is inserted into a video elementary stream loop arranged corresponding to each of the video streams under the program map table.

The transport stream TS generated by the multiplexer 105 is transmitted to the transmission unit 106. The transport stream TS is transmitted to the reception apparatus 200 on broadcast waves or packets on a network by the transmission unit 106.

[Configuration of Transport Stream TS]

Figure 10:
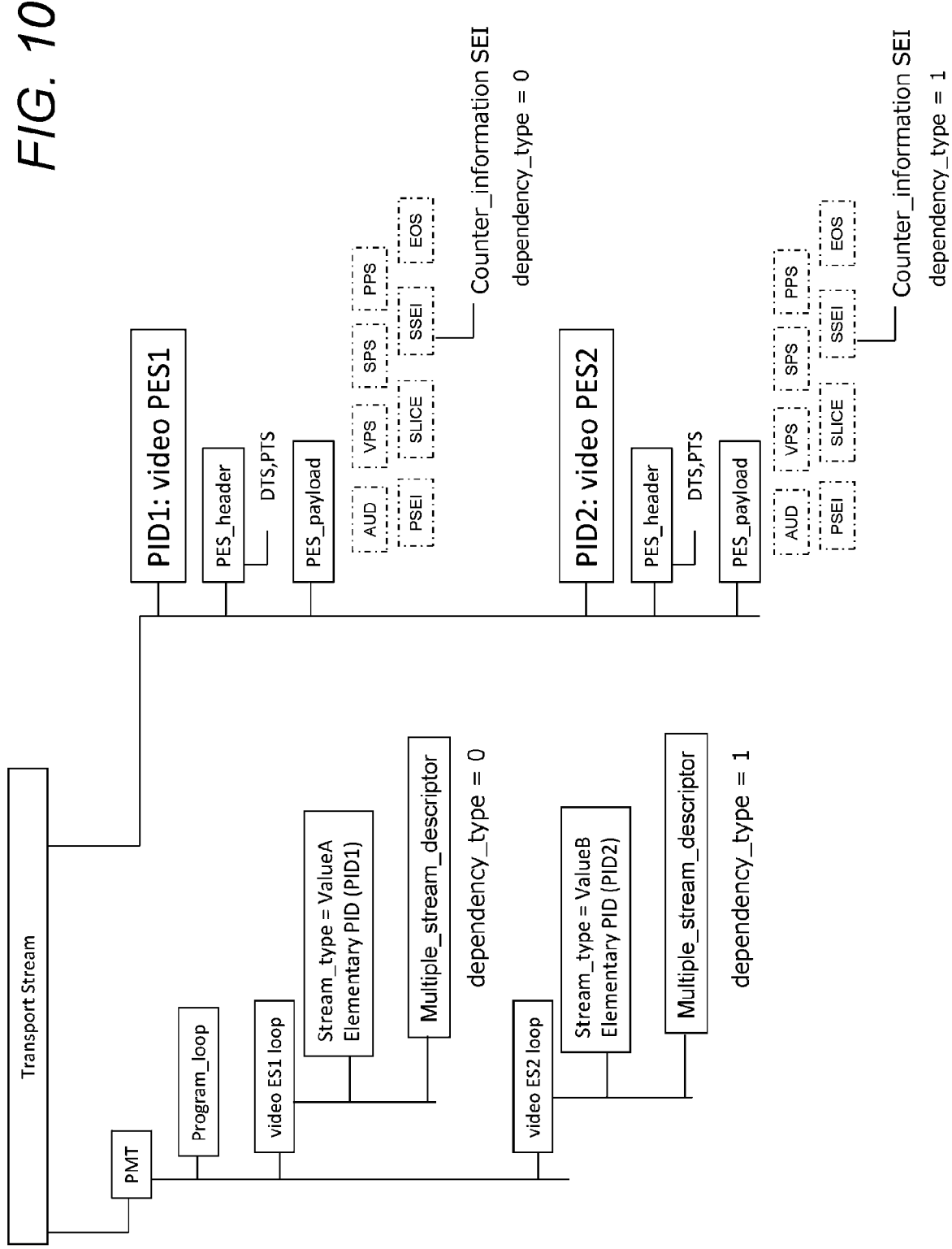
FIG. 10 is a diagram illustrating an exemplary configuration of a transport stream TS.

FIG. 10 illustrates an exemplary configuration of the transport stream TS. In this transport stream TS, a PES packet "video PES1" of the video stream VS1 exists and a PES packet "video PES2" of the video stream VS2 exists. Note that the illustrated example is a case where both of the video streams VS1 and VS2 are HEVC encoded streams. The packet identifier (PID) of the video stream VS1 is defined as PID 1, and the packet identifier (PID) of the video stream VS2 is defined as PID 2, for example.

The PES packet is formed with a PES header and a PES payload. A time stamp of DTS/PTS is inserted in the PES header, and access units of video streams VS1 and VS2 are inserted in the PES payload. The access unit includes NAL units such as AUD, VPS, SPS, PPS, PSEI, SLICE, SSEI and EOS.

In a case where the second method is adopted, as illustrated in the figure, a counter information SEI message (refer to FIG. 5) having the above-described count-up value "Graphical_Data_Increment" is inserted as an SEI message for each of pictures. In that case, in the PES packet of the video stream VS1, "dependency_type" is set to "0", indicating that the decoded output is to be independently displayed. In contrast, in the PES packet of the video stream VS2, "dependency_type" is set to "1", indicating that the decoded output is combined and displayed with the decoded output of the PES packet.

Moreover, the transport stream TS includes a program map table (PMT) as program specific information (PSI). The PSI is information describing each of elementary streams included in the transport stream belongs to which program.

The PMT includes a program loop (Program loop) that describes information related to the overall program. Moreover, an elementary stream loop having information associated with each of the elementary streams also exists in the PMT. In this configuration example, there is a video elementary stream loop (video ES loop) corresponding to each of the video stream VS1 and the video stream VS2.

Information such as a stream type (Value A), a packet identifier (PID1) is arranged and a descriptor describing information related to the video stream VS1 is also arranged in the video elementary stream loop corresponding to the video stream VS1. As one of the descriptors, the above-described multiple stream descriptor (refer to FIG. 7) is inserted. In this descriptor, "dependency_type" is set to "0", indicating that the decoded output is to be independently displayed.

Furthermore, information such as a stream type (Value B), a packet identifier (PID2) is arranged and a descriptor describing information related to the video stream VS2 is also arranged in the video elementary stream loop corresponding to the video stream VS2. As one of the descriptors, the above-described multiple stream descriptor (refer to FIG. 7) is inserted. In this descriptor, "dependency_type" is set to "1", indicating that the decoded output is combined and displayed with the decoded output of the PES packet.

<Configuration Example of Reception Apparatus (Corresponding to Low Quality Format Alone)>

Figure 11:
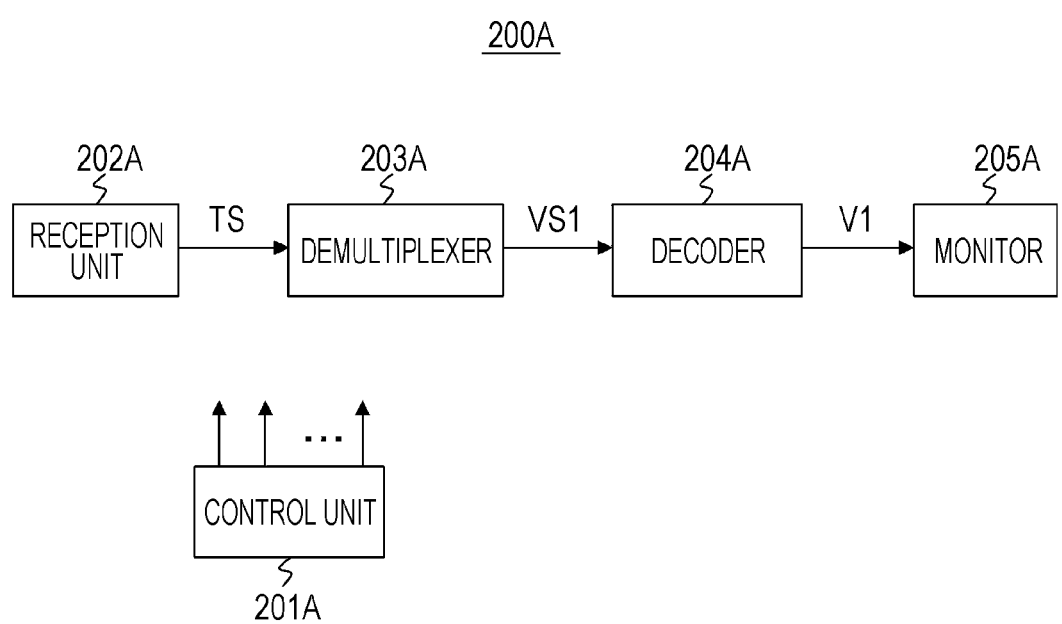
FIG. 11 is a block diagram illustrating an exemplary configuration of a reception apparatus (corresponding to low quality format alone) constituting a transmission-reception system.

FIG. 11 illustrates an exemplary configuration of a reception apparatus 200A. The reception apparatus 200A is an example of a case of supporting low quality format alone. The reception apparatus 200A includes a control unit 201A, a reception unit 202A, a demultiplexer 203A, a decoder 204A, and a monitor 205A. The control unit 201A includes a central processing unit (CPU), and controls operation of individual portions of the reception apparatus 200A on the basis of a control program.

The reception unit 202A receives the transport stream TS transmitted from the transmission apparatus 100 over broadcast waves or packets on a network. The transport stream TS includes a video stream VS1 and a video stream VS2. The demultiplexer 203A extracts a video stream VS1 from the transport stream TS by PID filtering. This video stream VS1 is obtained by encoding image data V1 of low quality format.

Furthermore, the demultiplexer 203A extracts section information included in the layer of the transport stream TS, and transmits the extracted section information to the control unit (CPU) 201A. This section information also includes a multiple stream descriptor (refer to FIG. 7), although disregarded in the reception apparatus 200A supporting the low quality format alone.

The decoder 204A decodes the video stream VS1 extracted by the demultiplexer 203A to obtain image data V1 of low quality format. Furthermore, the decoder 204A extracts information such as a parameter set and an SEI message inserted in each of access units constituting the video stream VS1 and transmits the extracted information to the control unit (CPU) 201A. In a case where the second method is adopted, a counter information SEI message (refer to FIG. 5) has been inserted in each of access units, although disregarded in the reception apparatus 200A supporting the low quality format alone. The monitor 205A displays an image of low quality format based on the image data V1 obtained by the decoder 204A, that is, an image of a normal dynamic range or an image of HD resolution.

Operation of the reception apparatus 200A illustrated in FIG. 11 will be briefly described. The reception unit 202A receives the transport stream TS transmitted from the transmission apparatus 100 over broadcast waves or packets on a network. This transport stream TS is supplied to the demultiplexer 203A. In the demultiplexer 203A, the video stream VS1 is extracted from the transport stream TS by filtering PID.

The video stream VS1 extracted by the demultiplexer 203A is supplied to the decoder 204A. The decoder 204A decodes the video stream VS1 to obtain the image data V1 of low quality format. This image data V1 is supplied to the monitor 205A. The monitor 205A displays an image of low quality format based on the image data V1.

<Configuration Example of Reception Apparatus (Supporting High Quality Format)>

Figure 12:
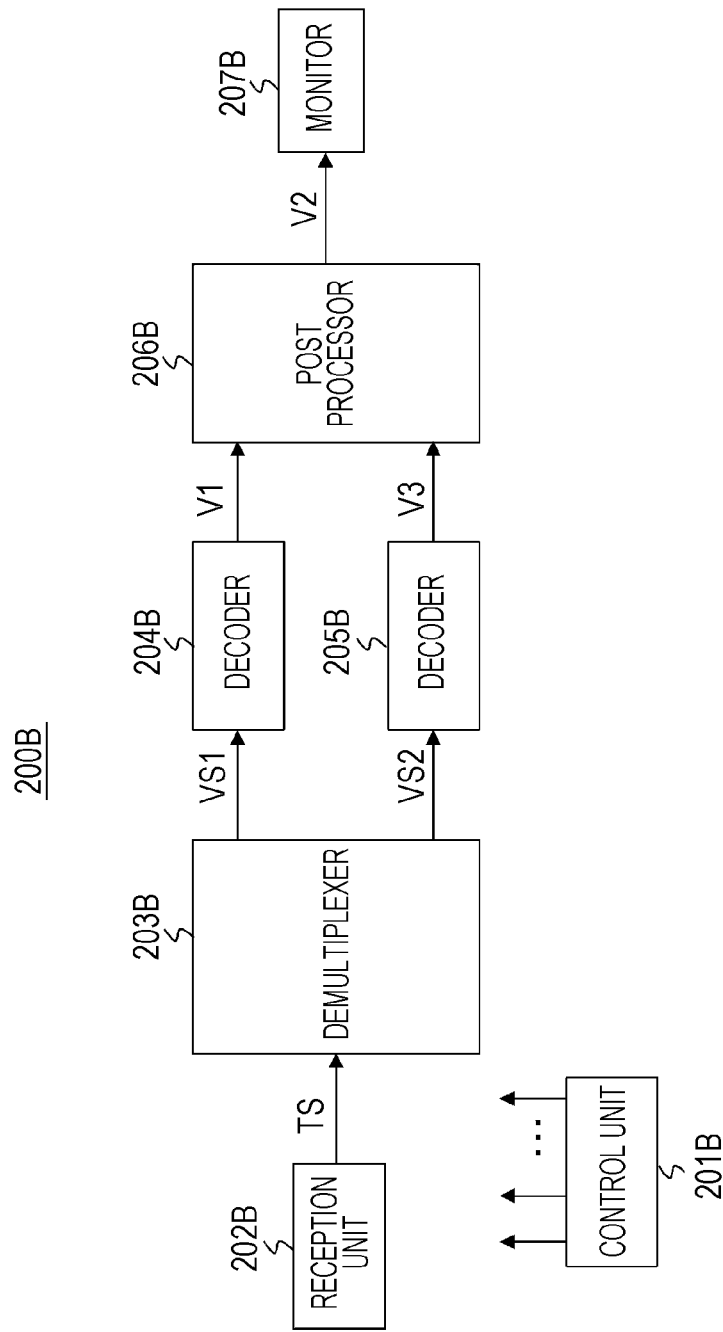
FIG. 12 is a block diagram illustrating an exemplary configuration of a reception apparatus (supporting high quality format) constituting a transmission-reception system.

FIG. 12 illustrates an exemplary configuration of the reception apparatus 200B. The reception apparatus 200B is an example of a case of supporting high quality format. The reception apparatus 200B includes a control unit 201B, a reception unit 202B, a demultiplexer 203B, decoders 204B and 205B, a post processor 206B, and a monitor 207B. The control unit 201B includes a central processing unit (CPU), and controls operation of individual portions of the reception apparatus 200B on the basis of a control program.

The reception unit 202B receives the transport stream TS transmitted from the transmission apparatus 100 over broadcast waves or packets on a network. The transport stream TS includes a video stream VS1 and a video stream VS2. The video stream VS1 is obtained by encoding the image data V1 of low quality format. The video stream VS2 is obtained by encoding the image data V3 as the difference between the image data V2 of high quality format and the image data V1 of low quality format.

The demultiplexer 203B extracts the video stream VS1 and the video stream VS2 by PID filtering from the transport stream TS. Furthermore, the demultiplexer 203B extracts section information contained in the layer of the transport stream TS, and transmits the extracted section information to the control unit (CPU) 201B. This section information also includes a multiple stream descriptor (refer to FIG. 7).

The decoder 204B decodes the video stream VS1 extracted by the demultiplexer 203B to obtain the image data V1 of low quality format. Furthermore, the decoder 204B extracts information such as a parameter set and an SEI message inserted in each of access units constituting the video stream VS1, and transmits the extracted information to the control unit (CPU) 201B. In a case where the second method is adopted on the transmission side, this information also includes a counter information SEI message (refer to FIG. 5).

Figure 13:
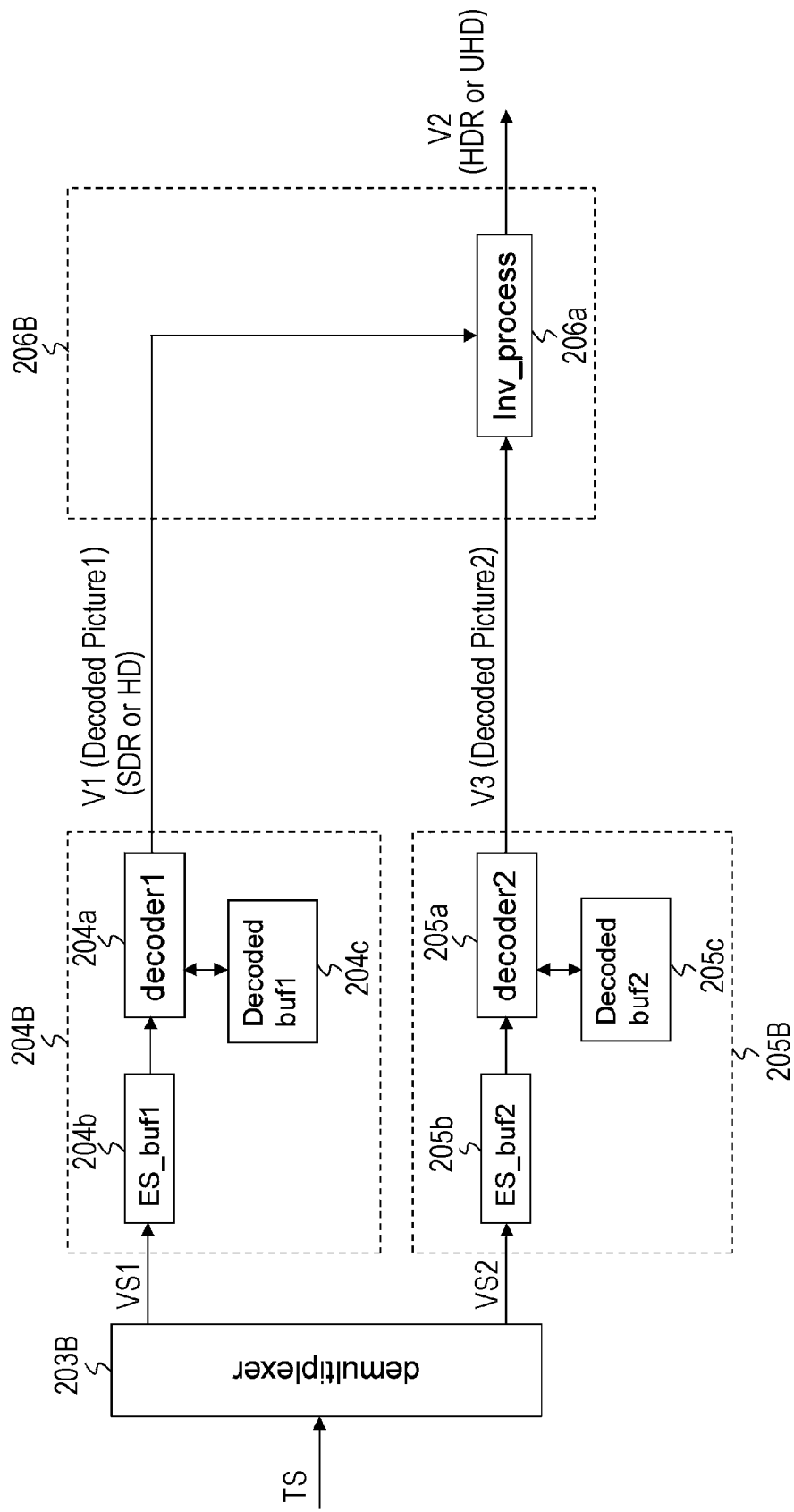
FIG. 13 is a diagram for illustrating a detailed configuration of a decoder and a post processor.
Figure 14:
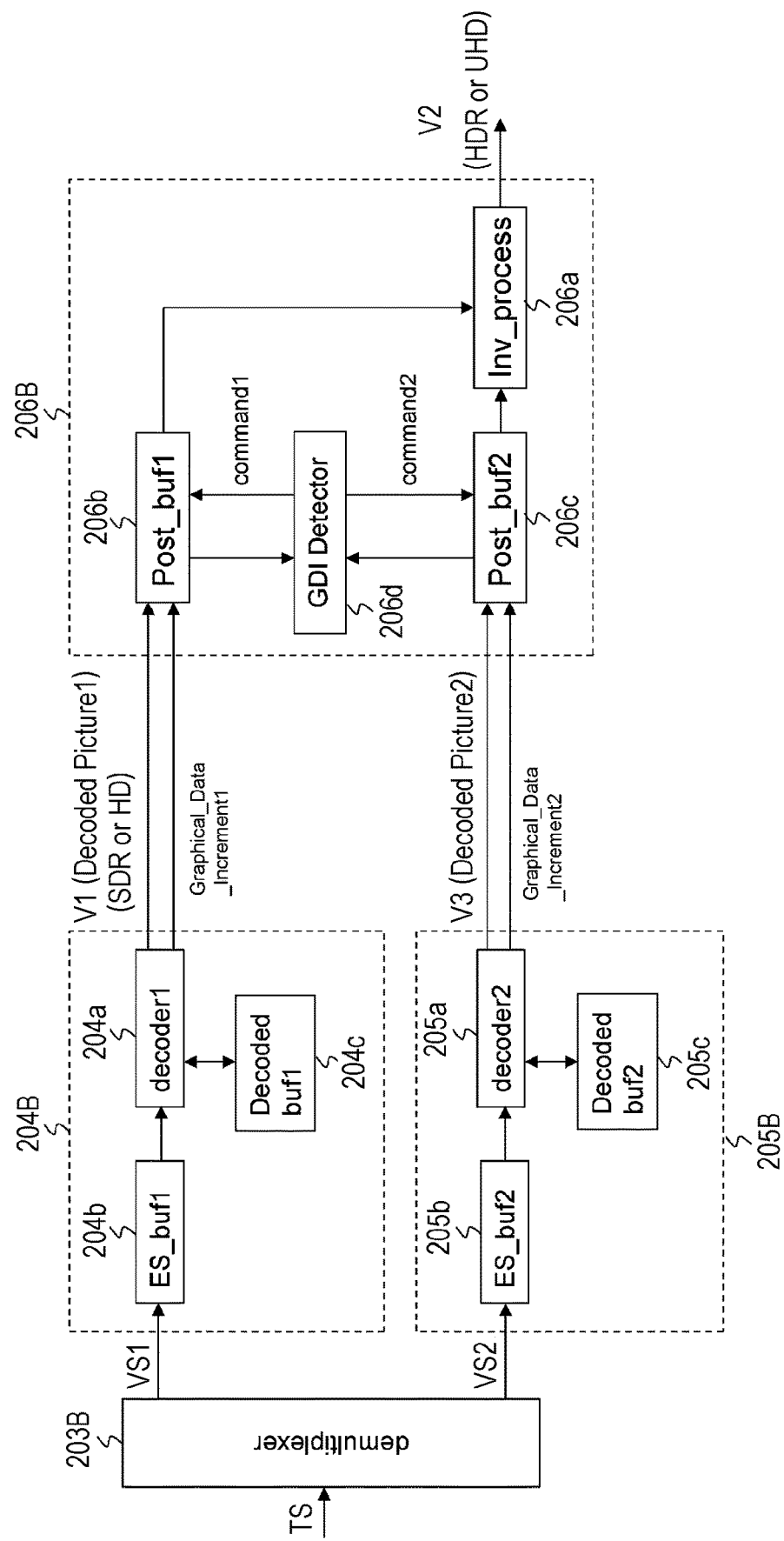
FIG. 14 is a diagram for illustrating a detailed configuration of a decoder and a post processor.

As illustrated in FIGS. 13 and 14, the decoder 204B includes a decoding unit (decoder 1) 204a, an elementary stream buffer (ES_buf 1) 204b, a decoded buffer (Decoded buf 1) 204c, and the like. The elementary stream buffer 204b temporarily accumulates the video stream VS1 obtained by the demultiplexer 203B. The decoding unit 204a reads the encoded image data of each of pictures accumulated in the elementary stream buffer 204b at the timing indicated by DTS and decodes the encoded image data.

The decoded buffer 204c temporarily accumulates image data of each of pictures obtained by decoding by the decoding unit 204a. The image data (Decoded Picture 1) of each of pictures of the image data V1 accumulated in the decoded buffer 204c is read at the timing indicated by the PTS or "dpb_output_delay" and output. In a case where the second method is adopted, a count-up value "Graphical_Data_Increment 1" updated for each of pictures is added to the image data (Decoded Picture 1) of each of pictures to be output as illustrated in FIG. 14.

The decoder 205B decodes the video stream VS2 extracted by the demultiplexer 203B to obtain the image data V3. Furthermore, the decoder 205B extracts information such as a parameter set and an SEI message inserted in each of access units constituting the video stream VS2, and transmits the extracted information to the control unit (CPU) 201B. In a case where the second method is adopted, this information also includes a counter information SEI message (refer to FIG. 5).

As illustrated in FIGS. 13 and 14, the decoder 205B includes a decoding unit (decoder 2) 205a, an elementary stream buffer (ES_buf 2) 205b, a decoded buffer (Decoded buf 2) 205c, and the like. The elementary stream buffer 205b temporarily accumulates the video stream VS2 obtained by the demultiplexer 203B. The decoding unit 205a reads the encoded image data of each of pictures accumulated in the elementary stream buffer 205b at the timing indicated by DTS and decodes the encoded image data.

The decoded buffer 205c temporarily accumulates image data of each of pictures obtained by decoding by the decoding unit 205a. The image data (Decoded Picture 2) of each of pictures of the image data V3 accumulated in the decoded buffer 205c is read at the timing indicated by the PTS or "dpb_output_delay" and output. In a case where the second method is adopted, a count-up value "Graphical_Data_Increment 2" updated for each of pictures is added to the image data (Decoded Picture 2) of each of pictures to be output as illustrated in FIG. 14.

Returning to FIG. 12, the post processor 206B obtains the image data V2 of high quality format on the basis of the image data V1 obtained by the decoder 204B and the image data V3 obtained by the decoder 205B. In a case where the first method is adopted on the transmission side, the image data V1 output from the decoder 204B and the image data V3 output from the decoder 205B are synchronous. That is, the corresponding pictures of the image data V1 and the image data V3 are output at the same timing. Therefore, the post processor 206B uses the image data V1 and V3 respectively output from the decoders 204B and 205B without performing synchronization processing.

In this case, as illustrated in FIG. 13, the post processor 206B includes an inverse processing unit (Inv_process) 206a. The inverse processing unit 206a performs processing reverse of the processing in the processing unit 102b of the preprocessor 102 in FIGS. 3 and 4 onto the image data of each of pictures of the image data V1 and V3 respectively output from the decoders 204B and 205B so as to obtain the image data V2 of high quality format.

In contrast, in a case where the second method is adopted on the transmission side, the image data V1 output from the decoder 204B and the image data V3 output from the decoder 205B might not be synchronous. That is, the corresponding pictures of the image data V1 and the image data V3 might not be output at the same timing. Therefore, the post processor 206B uses the image data V1 and V3 respectively output from the decoders 204B and 205B after performing synchronization processing.

In this case, as illustrated in FIG. 14, the post processor 206B includes an inverse processing unit (Inv_process) 206a, a post buffer (Post_buf1) 206b, a post buffer (Post_buf2) 206c, and a GDI detector (GDI Detector) 206d. The post buffers 206b and 206c and the GDI detector 206d perform synchronization processing on the image data V1 and V3, so as to achieve a stably synchronized state of the image data V1 output from the post buffer 206b and the image data V3 output from the post buffer 206c.

Figure 15:
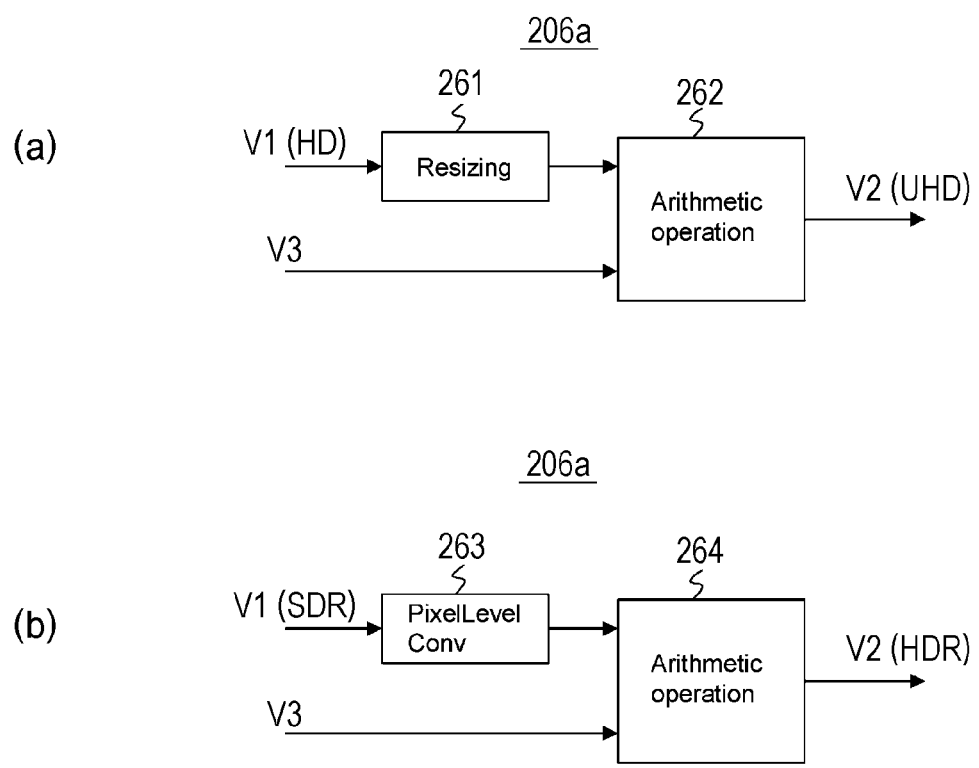
FIG. 15 is a block diagram illustrating an exemplary configuration of an inverse processing unit.

The inverse processing unit 206a performs processing reverse of the processing in the processing unit 102b of the preprocessor 102 in FIGS. 3 and 4 onto the image data of each of pictures of the image data V1 and V3 respectively output from the post buffers 206b and 206c so as to obtain the image data V2 of high quality format (refer to FIGS. 15(a) and 15(b)).

FIG. 15(a) illustrates an exemplary configuration of the inverse processing unit 206a when the image data V1 is HD resolution image data and the image data V2 is UHD resolution image data. The inverse processing unit 206a includes a resizing unit (Resizing) 261 and an arithmetic operation unit (Arithmetic operation) 262.

The resizing unit 261 performs resizing of image data such that the resolution of the HD resolution image data V1 becomes UHD resolution. The arithmetic operation unit 262 adds the resized image data V1 and the image data V3 to obtain the image data V2 of UHD resolution.

FIG. 15(b) illustrates an exemplary configuration of the inverse processing unit 206a when image data V1 is image data of a normal dynamic range (SDR) and image data V2 is image data of a high dynamic range (HDR). The inverse processing unit 206a includes a pixel level converter (Pixel Level Conv) 263 and an arithmetic operation unit (Arithmetic operation) 264.

The pixel level converter 263 converts the value of the encoded sample data such that the luminance level of the image data V1 of the normal dynamic range becomes the same level as the luminance of the high dynamic range. The arithmetic operation unit 264 adds the image data V1 having luminance level converted and the image data V3 to obtain image data V2 of a high dynamic range.

An exemplary configuration of the inverse processing unit 206a in a case where the image data V1 is the image data of the SDR 709 and the image data V2 is the image data of the HDR 2020 will be further described. The processing of the inverse processing unit 206a depends on the processing of the processing units 102a and 102b (refer to FIGS. 3 and 4) in the preprocessor 102 of the transmission apparatus 100.

Figure 16:
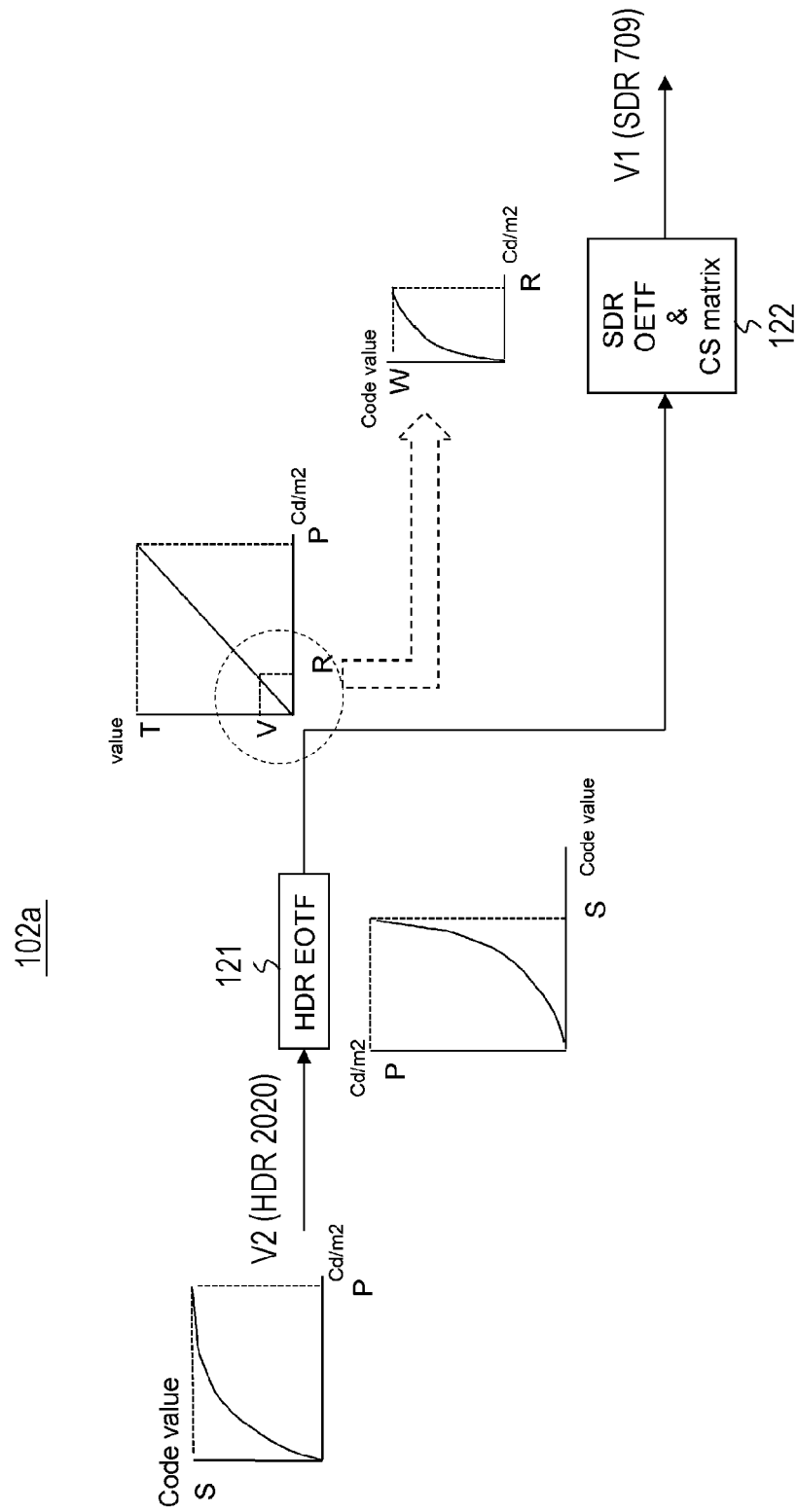
FIG. 16 is a diagram for illustrating details of processing in a preprocessor of a transmission apparatus.

FIG. 16 illustrates a detailed configuration example of the processing unit 102a. The processing unit 102a includes: a processing unit 121 that performs conversion processing of HDR EOTF; and a processing unit 122 that performs conversion processing of SDR OETF and matrix conversion processing from a color gamut 2020 to a color gamut 709.

The image data V2 of the HDR 2020 produced by the HDR (P-S characteristic) is supplied to the processing unit 121 and is converted into linear spatial luminance (cd/m2) (P, T) by the HDR EOTF (S-P characteristic). The output image data of the processing unit 121 is supplied to the processing unit 122, and the partial region (R, V) corresponding to the SDR luminance of the (P, T) plane is set to gamma characteristics by SDR OETF (R-W characteristics), further converted from the color gamut 2020 to the color gamut 709 by matrix processing so as to generate the image data V1 of the SDR 709.

Figure 17:
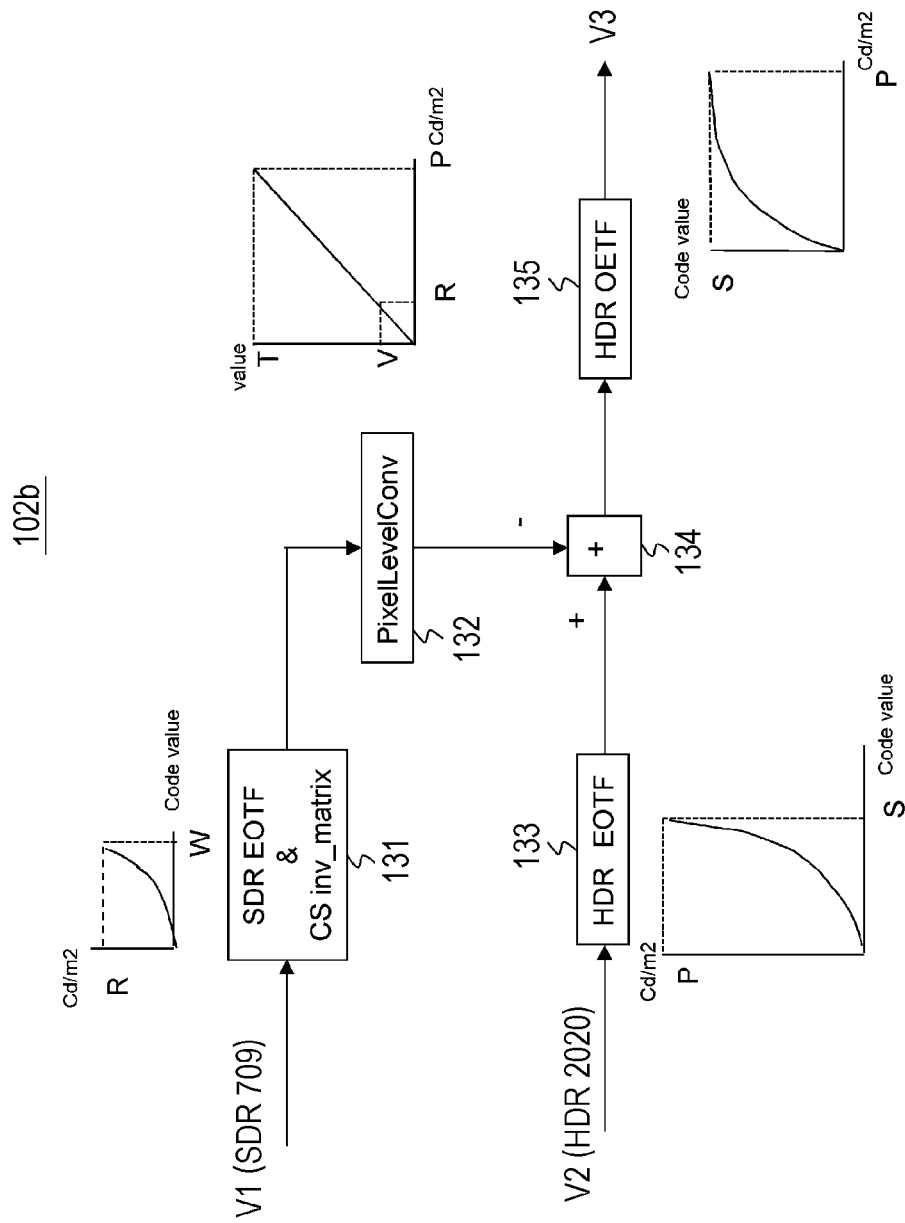
FIG. 17 is a diagram for illustrating details of processing in a preprocessor of a transmission apparatus.

FIG. 17 illustrates a detailed configuration example of the processing unit 102b. The processing unit 102b includes: a processing unit 131 that performs SDR EOTF conversion processing and matrix processing from the color gamut 709 to the color gamut 2020; a processing unit 132 that performs pixel level conversion processing; a processing unit 133 that performs HDR EOTF conversion processing; a processing unit 134 that performs subtraction processing; and a processing unit 135 that performs HDR OETF conversion processing.

The image data V2 of the HDR 2020 is supplied to the processing unit 133 and is converted into linear spatial luminance (cd/m2) (P, T) by the HDR EOTF (S-P characteristic). The image data V1 of the SDR 709 from the processing unit 102a is supplied to the processing unit 131, converted into linear spatial luminance (cd/m2) (R, V) by SDR EOTF (W-R characteristics), and further converted from the color gamut 709 to the color gamut 2020 by matrix processing.

The output image data of the processing unit 131 is supplied to the processing unit 132 and mapped to a (P, T) space. The output image data of the processing unit 133 and the output image data of the processing unit 132 are supplied to the processing unit 134 and undergoes subtraction processing. Then, the output image data of the processing unit 134 is supplied to the processing unit 135, undergoes HDR OETF conversion processing, so as to be output image data V3 to the encoder (Encoder 2) 104.

FIG. 18 illustrates a detailed configuration example of the inverse processing unit 206a. The inverse processing unit 206a includes: a processing unit 261 that performs SDR EOTF conversion processing and matrix processing from the color gamut 709 to the color gamut 2020; a processing unit 262 that performs pixel level conversion processing; a processing unit 263 that perform HDR EOTF conversion processing; and a processing unit 264 that performs addition processing.

The image data V3 of the HDR 2020 is supplied to the processing unit 263 and is converted into linear spatial luminance (cd/m2) (P, T) by the HDR EOTF (S-P characteristic). The image data V1 of the SDR 709 is supplied to the processing unit 261, converted into linear spatial luminance (cd/m2) (R, V) by SDR EOTF (W-R characteristics), and further converted from the color gamut 709 to the color gamut 2020 by matrix processing.

The output image data of the processing unit 261 is supplied to the processing unit 262 and mapped to the (P, T) space. The output image data of the processing unit 263 and the output image data of the processing unit 262 are supplied to the processing unit 264 and undergo addition processing, so as to obtain image data V2 of the HDR 2020.

<Synchronization Processing>

Synchronization processing of the image data V1 and V3 by the post buffers 206b, 206c and the GDI detector 206d will be described. Image data (Decoded Picture 1) of each of pictures of the image data V1 output from the decoder 204B is temporarily stored in a queue of the post buffer 206b. In this case, the count-up value "Graphical_Data_Increment 1" added to the image data of each of pictures is also stored together with the image data.

Meanwhile, image data (Decoded Picture 2) of each of pictures of the image data V3 output from the decoder 205B is temporarily stored in a queue of the post buffer 206c. In this case, the count-up value "Graphical_Data_Increment 2" added to the image data of each of pictures is also stored together with the image data.

The GDI detector 206d reads and compares the count-up values ("Graphical_Data_Increment 1", "Graphical_Data_Increment 2") respectively from the queues of the post buffers 206b and 206c. Then, control commands ("Command 1" and "Command 2") are transmitted from the GDI detector 206d to the post buffers 206b and 206c, respectively, and reading of the image data is controlled.

Here, in a case where the count-up values match, the image data is read from each of the post buffers 206b and 206c at the same timing. In contrast, when the individual count-up values do not match with each other, the image data from the larger post buffer is not read by buffering, and image data is read from each of the post buffers 206b and 206c at a point where the smaller value becomes equal to the other.

FIG. 19(a) illustrates the type (Command_type) of the control command transmitted from the GDI detector 206d to the post buffer and its content (Semantics). The control command "Read" instructs "to read a new picture from the buffer". The control command "Buffered" indicates "to buffer and wait for reading". The control command "Skip & Read" instructs "to skip and read pictures from the buffer". The control command "Buffer Clear" instructs to "empty the buffer (used at the time of startup or RAP reproduction)". The control command of "Wait" indicates to "wait for buffer reading".

FIG. 19(b) illustrates a case that can occur in the comparison of the count-up values ("Graphical_Data_Increment 1", "Graphical_Data_Increment 2") read from the queues of the post buffers 206b and 206c respectively and illustrates control commands to be transmitted from the GDI detector 206d to the post buffers 206b and 206c in this case. In this figure, "GDI 1" indicates "Graphical_Data_Increment 1" and "GDI 2" indicates "Graphical_Data_Increment 2".

FIG. 20 is a diagram schematically illustrating an example of reading procedure from the post buffer (Post_buf1) 206b and the post buffer (Post_buf2) 206c in case 0 (Case=0), case 1 (Case=1), case 2 (Case=2), and case 3 (Case=3) in FIG. 19(b). Here, it is recognized that the post buffer (Post_buf1) 206b performs buffering of image data to be independently displayed by "dependency_type", while buffers other than the post buffer (Post_buf1) 206b performs buffering of data assumed to be combined with at least the image data to be independently displayed by "dependency_type".

In case 0 (Case=0) in FIG. 19 (b), GDI1=GDI2, and a control command of "Read" is transmitted to both the post buffer (Post_buf1) 206b and the post buffer (Post_buf2) 206c. In this case, as indicated by "Case 0" in FIG. 20, the GDI value (count-up value) for queue reading of both post buffers matches, and reading is performed from each of the post buffers 206b and 206c in the order of queue.

In case 1 (Case=1) in FIG. 19 (b), GDI 1>GDI 2, and then, a control command of "Read" is transmitted to the post buffer (Post_buf1) 206b, while a control command of "Skip & Read" is transmitted to the post buffer (Post_buf2) 206c. As illustrated in "Case 1" in FIG. 20, this case corresponds to the case where accumulation in the post buffer 206b precedes accumulation in the post buffer 206c. On condition that the data accumulation state of the queue of the post buffer 206c is not empty, the queue of the post buffer 206c is read quickly by the control command "Skip & Read", and the queue reading of the post buffer 206b is matched with the GDI value to perform reading from each of the post buffers 206b and 206c.

In the case 2 (Case=2) in FIG. 19(b), GDI 1>GDI 2 is established, and a control command of "Buffered" is transmitted to the post buffer (Post_buf1) 206b, while a control command of "Wait" is transmitted to the post buffer (Post_buf2) 206c. As illustrated in "Case 2" in FIG. 20, this case corresponds to the case where accumulation in the post buffer 206b precedes accumulation in the post buffer 206c. When the data accumulation state of the queue of the post buffer 206c is empty, the queue of the post buffer 206c is not read quickly, the queue reading of the post buffer 206b is waited in buffering, until matching with the GDI value of the post buffer 206c is achieved. In this case, mutual reading with the post buffer 206b may be performed at an early stage by performing the processing of case 1 (Case=1), that is, quick reading of the post buffer 206c at the stage when a certain amount of data is stored in the post buffer 206c.

In case 3 (Case=3) in FIG. 19(b), GDI1<GDI 2 is established, and then, a control command of "Read" is transmitted to the post buffer (Post_buf1) 206b, while a control command of "Buffered" is transmitted to the post buffer (Post_buf2) 206c. As illustrated in "Case 3" in FIG. 20, this case corresponds to the case where accumulation in the post buffer 206c precedes accumulation in the post buffer 206b. Queue reading of the post buffer 206c is waited by buffering, GDI value matching with the post buffer 206b is performed, and then reading from each of the post buffers 206b and 206c is performed.

In the case 4 (Case=4) in FIG. 19(b), GDI 1<GDI 2 is established, and then, a control command of "Wait" is transmitted to the post buffer (Post_buf1) 206b, while a control command of "Buffered" is transmitted to the post buffer (Post_buf2) 206c. This case is similar to case 2 (Case=2), except that the post buffers 206b and 206c are in reverse states.

FIG. 21 illustrates an example of control in the GDI detector (GDI_Detector) 206d. This example is an example where the queue depth is four stages. (1) is an example in the case of "Case 1". In timeslot T1, GDI 1 is "1" and GDI 2 has no value. In this timeslot, GDI 1>GDI 2 is established and the queue of the post buffer 206c is not empty.

Therefore, the control command (command 1) to the post buffer (Post_buf1) 206b is set to "Read" and the control command (command 2) to the post buffer (Post_buf2) 206c is set to "Skip & Read". As a result, the queue of the post buffer (Post_buf2) 206c is read quickly and the GDI 2 "becomes "1", achieving a match between the queue reading of the post buffer 206b and the GDI value, and reading is performed from each of the post buffers 206b and 206c.

Next, in timeslot T2, GDI 1 is "2", GDI 2 "is" 2", and both the GDI values match. As a result, reading is performed from each of the post buffers 206b and 206c. This also applies to the following timeslots T3 and T4.

(2) is an example in the case of "Case 2". In timeslot T1, GDI 1 is "1" and GDI 2 has no value. In this timeslot, GDI 1>GDI 2 is established and the queue of the post buffer (Post_buf2) 206c is empty. Therefore, the control command (command 1) to the post buffer (Post_buf1) 206b is set to "buffered" and the control command (command 2) to the post buffer (Post_buf2) 206c is set to "wait". As a result, queue reading of the post buffer (Post_buf1) 206b is waited. This similarly applies to the following timeslots T2 and T3.

Next, in timeslot T4, GDI 1, that is, GDI 1' is set to "1", GDI 2 is set to "1", indicating a match between both GDI values. As a result, the control command (command 1) to the post buffer (Post_buf1) 206b is set to "Read", the control command (command 2) to the post buffer (Post_buf2) 206c is also set to "Read", and reading is performed from each of the post buffers 206b and 206c.

(3) is an example in the case of "Case 3". In timeslot T1, GDI 2 is "1" and GDI 1 has no value. In this timeslot, a relationship GDI 2>GDI 1 is established. Therefore, the control command (command 1) to the post buffer (Post_buf1) 206b is not transmitted, while the control command (command 2) to the post buffer (Post_buf2) 206c is set to "buffered". As a result, queue reading of the post buffer (Post_buf2) 206c is waited.

Next, in timeslot T2, GDI 2, that is, GDI2' is set to "1", GDI 1 is set to "1", indicating a match between both GDI values. As a result, the control command (command 1) to the post buffer (Post_buf1) 206b is set to "Read", the control command (command 2) to the post buffer (Post_buf2) 206c is also set to "Read", and reading is performed from each of the post buffers 206b and 206c. This similarly applies to the following timeslots T3 and T4.

Figure 22:
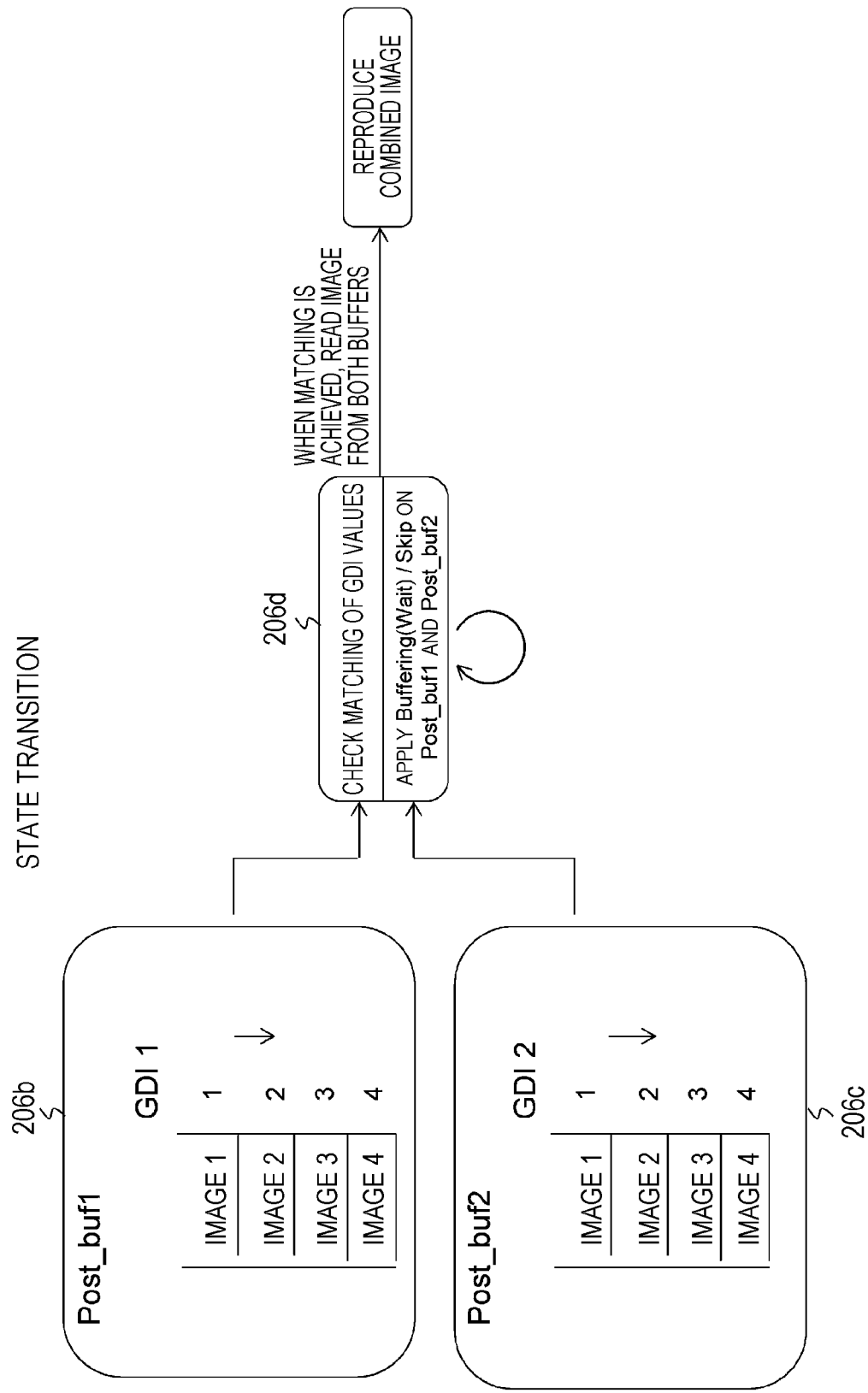
FIG. 22 is a diagram schematically illustrating a state transition in a case where image data is read from a queue of each of post buffers under the control of the GDI detector.

FIG. 22 schematically illustrates a state transition in a case where image data is read from the queues of the post buffer (Post_buf1) 206b and the post buffer (Post_buf2) 206c by the control of the GDI detector 206d.

Returning to FIG. 12, the monitor 207B displays the image of the high quality format based on the image data V2 obtained by the post processor 206B, that is, the image of the high dynamic range (HDR) or the image of the UHD resolution.

Operation of the reception apparatus 200B illustrated in FIG. 12 will be briefly described. The reception unit 202B receives the transport stream TS transmitted from the transmission apparatus 100 over broadcast waves or packets on a network. This transport stream TS is supplied to the demultiplexer 203B. The demultiplexer 203B extracts the video stream VS1 and the video stream VS2 by PID filtering from the transport stream TS.

Furthermore, the demultiplexer 203B extracts section information included in the layer of the transport stream TS, and transmits the extracted section information to the control unit (CPU) 201B. This section information also includes a multiple stream descriptor (refer to FIG. 7).

The video stream VS1 extracted by the demultiplexer 203B is supplied to the decoder 204B. The decoder 204B decodes the video stream VS1 to obtain the image data V1 of low quality format. Furthermore, the decoder 204B extracts information such as a parameter set and an SEI message inserted in each of access units constituting the video stream VS1, and transmits the extracted information to the control unit (CPU) 201B. In a case where the second method is adopted, this information also includes a counter information SEI message (refer to FIG. 5).

The video stream VS2 extracted by the demultiplexer 203B is supplied to the decoder 205B. The decoder 205B decodes the video stream VS2 to obtain image data V3. Furthermore, the decoder 205B extracts information such as a parameter set and an SEI message inserted in each of access units constituting the video stream VS2, and transmits the extracted information to the control unit (CPU) 201B. In a case where the second method is adopted on the transmission side, this information also includes a counter information SEI message (refer to FIG. 5).

The image data V1 and V3 respectively obtained by the decoders 204B and 205B are supplied to the post processor 206B. In the post processor 206B, the image data V2 of high quality format is obtained on the basis of the image data V1 and the image data V3.

In this case where the first method is adopted on the transmission side, the image data V1 output from the decoder 204B and the image data V3 output from the decoder 205B are synchronous. Therefore, in this case, in the post processor 206B, the image data V1 and V3 respectively output from the decoders 204B are 205B are used as they are without synchronization processing.

In contrast, in a case where the second method is adopted on the transmission side, the image data V1 output from the decoder 204B and the image data V3 output from the decoder 205B might not be synchronous. Therefore, in this case, in the post processor 206B, the image data V1 and V3 respectively from the decoders 204B and 205B undergo synchronization processing based on the GDI value (count-up value "Graphical_Data_Increment") and then used.

The image data V2 obtained by the post processor 206B is supplied to the monitor 207B. The monitor 207B displays an image of high quality format based on the image data V2 (image data of high dynamic range or image data of UHD resolution).

As described above, in the transmission-reception system 10 illustrated in FIG. 1, the transmission apparatus 100 performs processing enabling synchronous acquisition of the image data V1 and V3 on the reception side when encoding the image data V1 and V3 by the encoders 103 and 104 respectively. In the case of adopting the first method, for example, the image data V1 and V3 are encoded to achieve matching in display timings of corresponding pictures. Furthermore, in the case of adopting the second method, for example, information for associating mutual pictures with each other is inserted into the encoded image data of the corresponding pictures of the image data V1 and V3. Therefore, this enables synchronous acquisition of the image data V1 and V3 on the reception side, making it possible to satisfactorily obtain the image data V2 in the high quality format on the basis of the image data V1 and V3.

2. Second Embodiment

[Exemplary Configuration of Transmission-Reception System]

Figure 23:
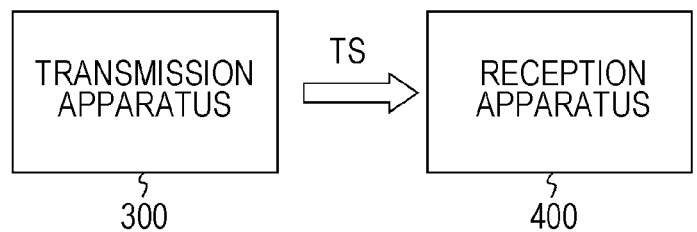
FIG. 23 is a block diagram illustrating an exemplary configuration of a transmission-reception system according to a second embodiment.

FIG. 23 illustrates an exemplary configuration of a transmission-reception system 20 according to a second embodiment. The transmission-reception system 20 includes a transmission apparatus 300 and a reception apparatus 400.

The transmission apparatus 300 transmits an MPEG-2 transport stream (hereinafter simply referred to as "transport stream TS") as a container stream (multiplexed stream) on broadcast waves or packets on a network. The transport stream TS includes first to Nth (N is an integer of 2 or more) video streams. The first to Nth video streams are video streams obtained by encoding first to Nth image data of N images to be synchronously displayed with HEVC, AVC or the like, respectively.

In encoding the first to Nth image data, the transmission apparatus 300 adopts the first method or the second method similarly to the first embodiment, so as to synchronous acquisition of the first to Nth image data on the reception side. Although detailed explanation is omitted, when adopting the first method, the first to Nth image data are encoded so as to achieve matching in display timings of corresponding pictures, and when adopting the second method, information for associating the pictures with each other is inserted into the encoded image data of the corresponding picture of the first to Nth image data.

The reception apparatus 400 receives the transport stream TS transmitted from the transmission apparatus 300 over broadcast waves or packets on a network. The transport stream TS includes first to Nth video streams as described above. The reception apparatus 400 extracts the first to Nth streams from the transport stream TS and decodes the streams to obtain first to Nth image data.

Here, in a case where the first method is adopted on the transmission side, the first to Nth image data are obtained synchronously, that is, the corresponding pictures are obtained at the same timing. In contrast, in a case where the second method is adopted on the transmission side, the corresponding pictures of the first to Nth image data might not be synchronous. Therefore, the first to Nth image data are set to a synchronized state on the basis of information for associating mutual pictures with each other.

The reception apparatus 400 supplies the first to the Nth image data in synchronized states to the first to the Nth monitors (screen devices) respectively, and displays the first to Nth image data to the first to Nth monitors synchronously.

<Exemplary Configuration of Transmission Apparatus>

Figure 24:
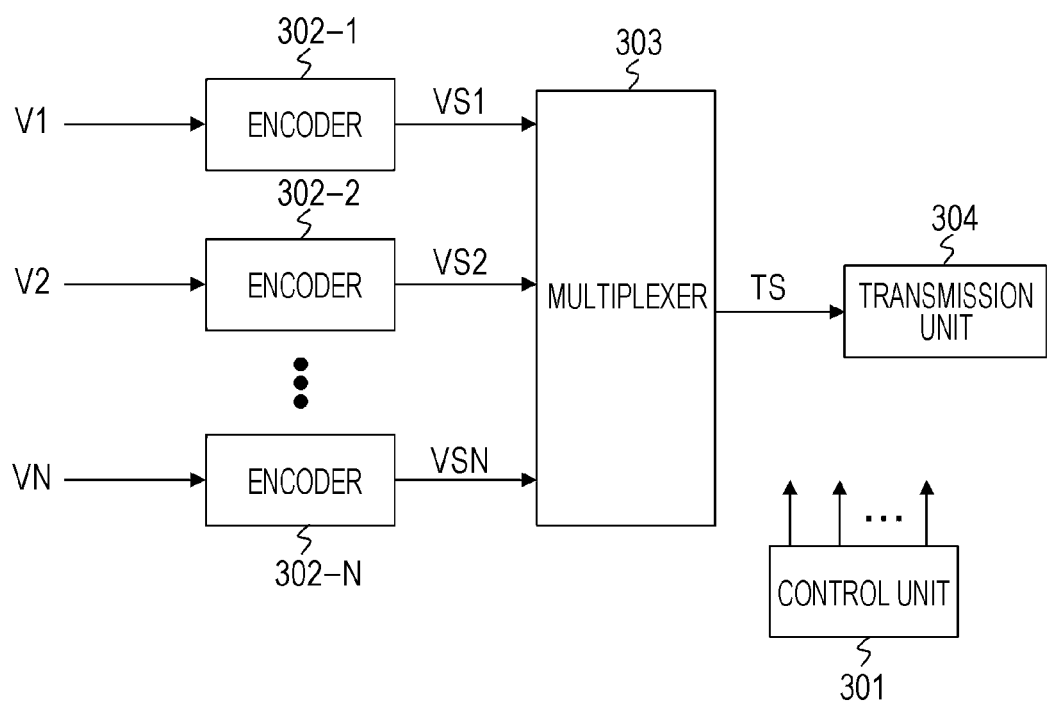
FIG. 24 is a block diagram illustrating an exemplary configuration of a transmission apparatus forming a transmission-reception system.

FIG. 24 illustrates an exemplary configuration of the transmission apparatus 300. The transmission apparatus 300 includes a control unit 301, encoders 302-1 to 302-N, a multiplexer 303, and a transmission unit 304. The control unit 301 includes a central processing unit (CPU), and controls operation of individual portions of the transmission apparatus 300 on the basis of a control program.

The encoders 302-1 to 302-N encode, with HEVC, AVC or the like, the image data V1 to VN related to the N images to be synchronously displayed, respectively, to obtain the video streams VS1 to VSN. Here, it is assumed that the encoders 302-1 to 302-N can independently determine the encoded picture type without consideration of dependency between the encoders. The encoders 302-1 to 302-N adopt the first method or the second method in order to enable synchronous acquisition of the image data V1 to VN on the reception side in encoding.

In the case of adopting the first method, the encoders 302-1 to 302-N encode the image data V1 to VN respectively to achieve matching in display timings of corresponding pictures. In this case, either the HRD parameter or the picture encode count value reset by intra-picture is supplied from one of the encoders 302-1 to 302-N to another encoder, or a common HRD parameter is supplied to the encoder 302-1 To 302-N from the control unit (CPU) 301.

In contrast, in a case where the second method is adopted, the encoders 302-1 to 302-N insert information for associating pictures with each other in the encoded image data of the corresponding pictures. Specifically, the encoders 302-1 to 302-N respectively insert counter information SEI message (Counter_Information SEI message) (refer to FIG. 5) having information "Graphical_Data_Increment" into a portion of "Suffix_SEIs" of the access unit (AU), for example.

The multiplexer 303 converts the video streams VS1 to VSN respectively generated by the encoders 302-1 and 302-N into PES packets, further converts them into transport packets, and multiplexes them to obtain a transport stream TS as a multiplexed stream. Furthermore, the multiplexer 303 inserts stream information corresponding to each of the video streams VS1 to VSN into the layer of the transport stream TS.

The multiplexer 303 inserts the above-described multiple stream descriptor (Multiple_stream_descriptor) (refer to FIG. 7) having stream information into a video elementary stream loop arranged corresponding to each of video streams under the program map table.

The transmission unit 304 transmits the transport stream TS obtained by the multiplexer 303 over the broadcast waves or packets in the network to the reception apparatus 400.

Operation of the transmission apparatus 300 illustrated in FIG. 24 will be briefly described. The image data V1 to VN related to the N images to be synchronously displayed are supplied to the encoders 302-1 to 302-N, respectively. The encoders 302-1 to 302-N encodes the image data V1 to VN with HEVC, AVC or the like, respectively, so as to obtain the video streams VS1 to VSN.

In this case, the first method or the second method is adopted to enable synchronous acquisition of corresponding pictures of the image data V1 to VN on the reception side. In a case where the first method is adopted, the encoders 302-1 to 302-N encode the image data V1 to VN respectively to achieve matching in display timings of corresponding pictures. In this case, HRD parameters and picture encode count values are shared by the encoders 302-1 to 302-N.

Furthermore, in a case where the second method is adopted, information for associating pictures with each other is inserted into the encoded image data of the corresponding pictures in the encoders 302-1 to 302-N. In this case, the counter information SEI message (refer to FIG. 5) having the count-up value "Graphical_Data_Increment" is inserted in the encoded image data.

The video streams VS1 to VSN respectively obtained by the encoders 302-1 to 302-N are supplied to the multiplexer 303. The multiplexer 303 converts the video streams VS1 to VSN into PES packets, further converts them into transport packets, and multiplexes them to obtain a transport stream TS as a multiplexed stream.

Furthermore, the multiplexer 303 inserts stream information corresponding to each of the video streams VS1 to VSN into the layer of the transport stream TS. In this case, a multiple stream descriptor (refer to FIG. 7) having stream information is inserted into a video elementary stream loop arranged corresponding to each of the video streams under the program map table.

The transport stream TS generated by the multiplexer 303 is transmitted to the transmission unit 304. The transport stream TS is transmitted to the reception apparatus 400 on broadcast waves or packets on a network by the transmission unit 304.

<Exemplary Configuration of Reception Apparatus>

Figure 25:
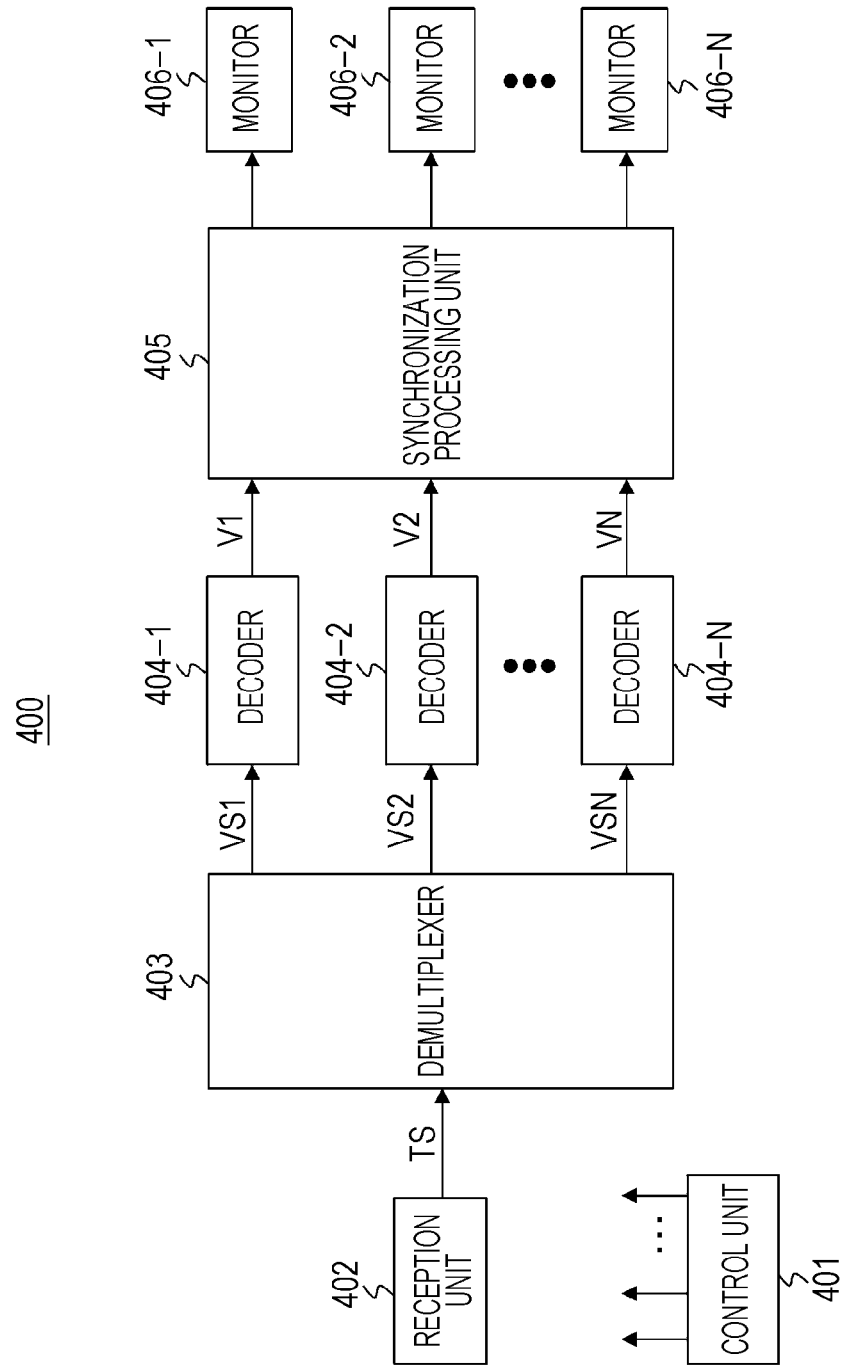
FIG. 25 is a block diagram illustrating an exemplary configuration of a reception apparatus forming a transmission-reception system.

FIG. 25 illustrates an exemplary configuration of the reception apparatus 400. The reception apparatus 400 includes a control unit 401, a reception unit 402, a demultiplexer 403, decoders 404-1 to 404-N, a synchronization processing unit 405, and monitors 406-1 to 406-N. The control unit 401 includes a central processing unit (CPU), and controls operation of individual portions of the reception apparatus 400 on the basis of a control program.

The reception unit 402 receives the transport stream TS transmitted from the transmission apparatus 300 over broadcast waves or packets on a network. The transport stream TS includes video streams VS1 to VSN. The video streams VS1 to VSN are respectively obtained by encoding with HEVC, AVC or the like, image data V1 to VN related to N images to be synchronously displayed.

The demultiplexer 403 extracts a video streams VS1 to VSN from the transport stream TS by PID filtering. Furthermore, the demultiplexer 403 extracts section information included in the layer of the transport stream TS, and transmits the extracted section information to the control unit (CPU) 401. This section information also includes a multiple stream descriptor (refer to FIG. 7).

The decoders 404-1 to 404-N decode video streams VS1 to VSN extracted by demultiplexer 403 to obtain image data V1 to VN, respectively. Furthermore, the decoders 404-1 to 404-N extract information such as a parameter set and an SEI message inserted in each of access units constituting the video streams VS1 to VSN, and transmits the extracted information to the control unit (CPU) 401. In a case where the second method is adopted on the transmission side, this information also includes a counter information SEI message (refer to FIG. 5).

In a case where the first method is adopted on the transmission side, the image data V1 to VN respectively output from the decoders 404-1 to 404-N are synchronous. That is, the corresponding pictures of the image data V1 to VN are output at the same timing. In contrast, in a case where the second method is adopted on the transmission side, the image data V1 to VN respectively output from the decoders 404-1 to 404-N might not be synchronous.

In a case where the first method is adopted on the transmission side, the synchronization processing unit 405 outputs the image data V1 to VN respectively output from the decoders 404-1 to 404-N as they are. In contrast, in a case where the second method is adopted on the transmission side, the synchronization processing unit 405 performs synchronization processing on the image data V1 to VN respectively output from the decoders 404-1 to 404-N and then outputs the image data. Although detailed explanation is omitted, this synchronization processing is performed on the basis of count-up value "Graphical_Data_Increment" as the information for associating the pictures of the image data V1 to VN with each other, similarly to the post processor 206B of the reception apparatus 200B in the first embodiment described above.

The monitors 406-1 to 406-N respectively display images based on the image data V1 to VN output from the synchronization processing unit 405. For example, each of the monitors 406-1 to 406-N constitutes each of screen devices functioning as a portion of the screen.

Figure 26:
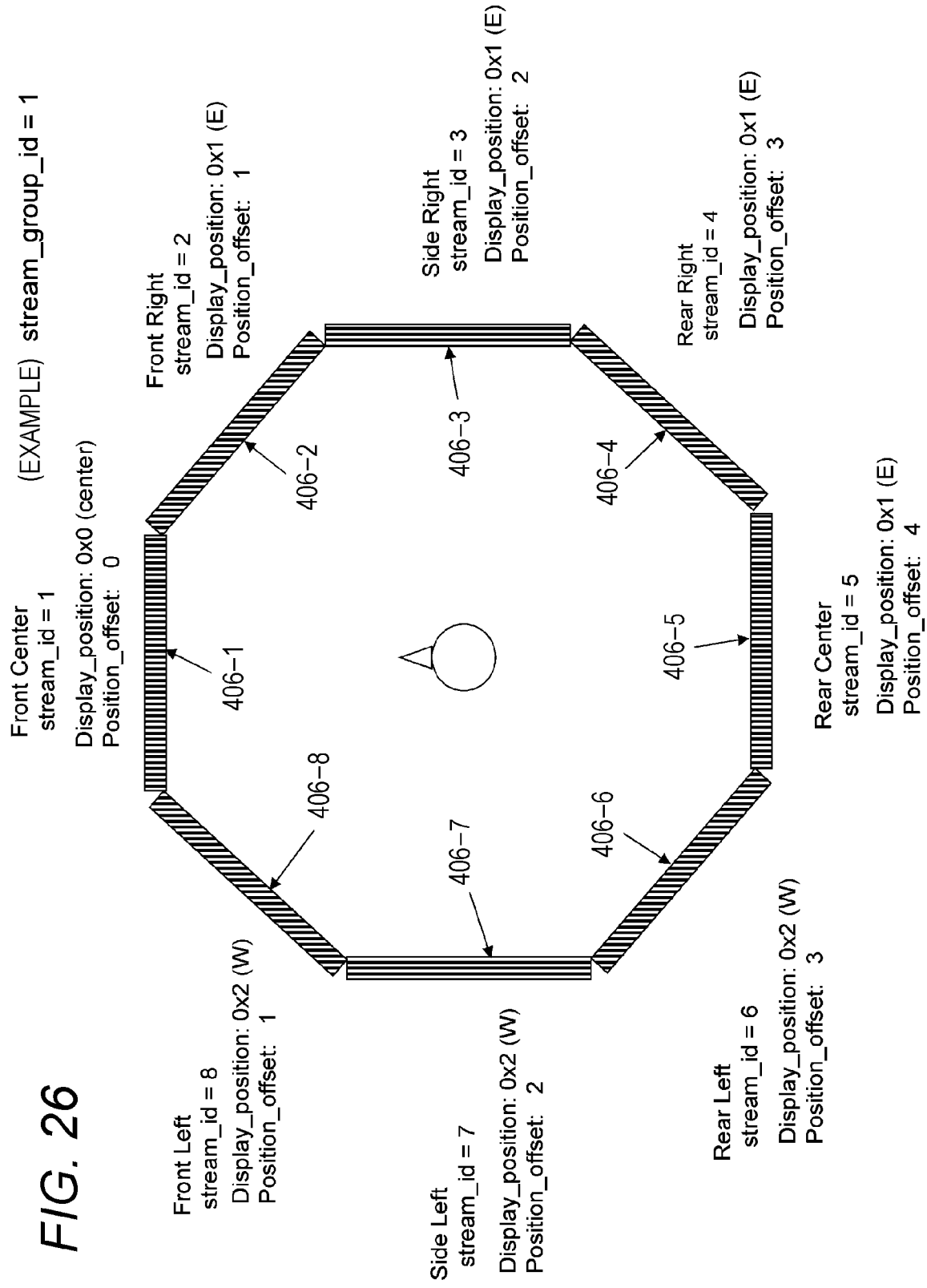
FIG. 26 is a view illustrating an exemplary screen including eight screen devices.

FIG. 26 illustrates an example of a screen including eight screen devices. In the descriptor of the ES loop of "Stream_id=1" that is a display to the "center" position, the identification information of the streams for displaying other than the "Center" position are such that "Corresponding_stream_id=2" (Stream_id=2), Corresponding_stream_id=3 "(Stream_id=3), . . . .

Figure 27:
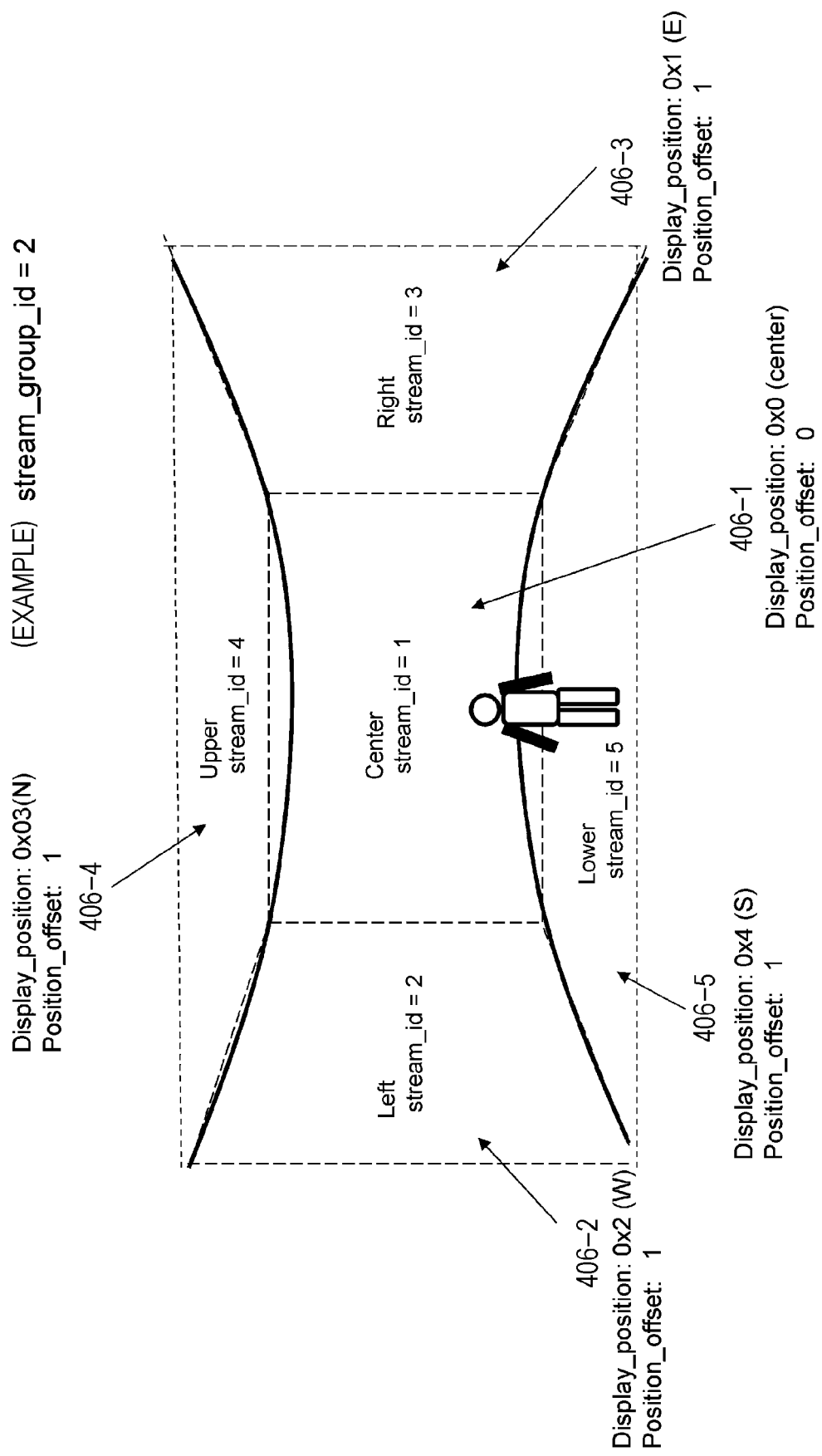
FIG. 27 is a view illustrating an exemplary screen including five screen devices.

Furthermore, FIG. 27 illustrates an example of a screen including five screen devices. In the descriptor of the ES loop of "Stream_id=1" that is a display to the "center" position, the identification information of the streams for displaying other than the "Center" position are such that "Corresponding_stream_id=2" (Stream_id=2), Corresponding_stream_id=3 "(Stream_id=3), . . . . Note that display onto a curved surface depends on correction processing at the time of display.

Operation of the reception apparatus 400 illustrated in FIG. 25 will be briefly described. The reception unit 402 receives the transport stream TS transmitted from the transmission apparatus 300 over broadcast waves or packets on a network. This transport stream TS is supplied to the demultiplexer 403. The demultiplexer 403 extracts a video streams VS1 to VSN from the transport stream TS by PID filtering.

Furthermore, the demultiplexer 403 extracts section information included in the layer of the transport stream TS, and transmits the extracted section information to the control unit (CPU) 401. This section information also includes a multiple stream descriptor (refer to FIG. 7).

The video streams VS1 to VSN extracted by the demultiplexer 403 are supplied to the decoders 404-1 to 404-N, respectively. The decoders 404-1 to 404-N decodes the video streams VS1 to VSN to obtain image data V1 to VN, respectively. Furthermore, the decoders 404-1 to 404-N extract information such as a parameter set and an SEI message inserted in each of access units constituting the video streams VS1 to VSN, and transmits the extracted information to the control unit (CPU) 401. In a case where the second method is adopted on the transmission side, this information also includes a counter information SEI message (refer to FIG. 5).

The image data V1 to VN obtained by the decoders 404-1 to 404-N are respectively supplied to the monitors 406-1 to 406-N via the synchronization processing unit 405. In a case where the first method is adopted on the transmission side, the image data V1 to VN respectively output from the decoders 404-1 to 404-N are synchronous. Therefore, in this case, nothing is performed by the synchronization processing unit 405 onto the image data V1 to VN respectively obtained by the decoders 404-1 to 404-N and the data is output as it is. In contrast, in a case where the second method is adopted on the transmission side, the synchronization processing unit 405 performs synchronization processing on the image data V1 to VN respectively output from the decoders 404-1 to 404-N on the basis of the count-up value "Graphical_Data_Increment".

Image data V1 to VN in a synchronized state are supplied to the monitors 406-1 to 406-N, respectively. Then, N images based on the image data V1 to VN are displayed synchronously on the monitors 406-1 to 406-N, respectively.

As described above, in the transmission-reception system 20 illustrated in FIG. 23, the transmission apparatus 300 performs processing enabling synchronous acquisition of the image data V1 to VN on the reception side when encoding the image data V1 to VN by the encoders 302-1 to 302-N, respectively. For example, in the case of adopting the first method, the image data V1 to VN are encoded to achieve matching in display timings of corresponding pictures. Furthermore, in the case of adopting the second method, information for associating mutual pictures with each other is inserted into the encoded image data of the corresponding picture of the image data V1 to VN. Therefore, this makes it possible on the reception side to obtain the image data V1 to VN in a synchronized state, and possible to satisfactorily perform the synchronous display of the N images.

3. Modification

Note that the above-described embodiment illustrates an example in which the container is a transport stream (MPEG-2 TS). The present technology, however, is not limited to TS as the transport, and the video layers can be realized in a same manner even in the case of other packets, for example, ISO base media file format (ISOBMFF) and MPEG Media Transport (MMT).

Moreover, the present technology can also take the following configuration.

(1) A transmission apparatus including:

a plurality of encoders that encodes each of a plurality of pieces of image data to obtain a plurality of streams; and a transmission unit that transmits a container of a predetermined format containing the plurality of streams, in which the plurality of encoders encodes the plurality of pieces of image data so as to achieve matching in display timings of corresponding pictures.

(2) The transmission apparatus according to (1), in which either an HRD parameter or a picture encode count value reset by intra-picture is supplied from one of the plurality of encoders to another encoder, or alternatively, a common HRD parameter is externally supplied to the plurality of encoders.

(3) The transmission apparatus according to (1) or (2), in which the plurality of encoders includes: a first encoder that encodes first image data to obtain a first stream; and a second encoder that encodes a third image data obtained on the basis of the first image data and a second image data associated with the first image data to obtain a second stream, and the transmission unit transmits the container of the predetermined format containing the first stream and the second stream.

(4) The transmission apparatus according to (3), in which the second image data is image data of high quality format, the first image data is image data of low quality format obtained by processing the second image data, and the third image data is image data obtained as a difference between the second image data and the first image data.

(5) The transmission apparatus according to (4), in which the second image data is image data of a high dynamic range and the first image data is image data of a normal dynamic range, or alternatively, the second image data is image data of UHD resolution and the first image data is image data of HD resolution.

(6) The transmission apparatus according to any of (3) to (5), further including a processing unit configured to process the second image data to obtain the first image data, obtain the third image data on the basis of the first image data and the second image data, and output the first image data and the third image data.

(7) A transmission method including:

an encoding step of encoding each of a plurality of pieces of image data to obtain a plurality of streams; and a transmission step of transmitting, by a transmission unit, a container of a predetermined format containing the plurality of streams, in which the encoding step encodes the plurality of pieces of image data so as to achieve matching in display timings of corresponding pictures.

(8) A reception apparatus including a reception unit that receives a container of a predetermined format including a plurality of streams obtained by encoding each of a plurality of pieces of image data, the plurality of pieces of image data being encoded so as to achieve matching in display timings of corresponding pictures, and the reception apparatus further including a control unit that controls decode processing of decoding the plurality of streams to obtain the plurality of pieces of image data and controls processing using the plurality of pieces of image data.

(9) The reception apparatus according to (8), in which the container includes a first stream obtained by encoding the first image data and includes a second stream obtained by encoding third image data obtained on the basis of the first image data and the second image data associated with the first image data, the decode processing decodes the first stream to obtain the first image data and decodes the second stream to obtain the third image data, and the processing using the plurality of pieces of image data obtains the second image data on the basis of the first image data and the third image data.

(10) A reception method including a reception step of receiving, by a reception unit, a container of a predetermined format including a plurality of streams obtained by encoding each of a plurality of pieces of image data, the plurality of pieces of image data being encoded so as to achieve matching in display timings of corresponding pictures, and the reception method further including a control step of controlling processing of decoding the plurality of streams to obtain the plurality of pieces of image data and controlling processing using the plurality of pieces of image data.

(11) A transmission apparatus including:

a plurality of encoders that encodes each of a plurality of pieces of image data to obtain a plurality of streams; and a transmission unit that transmits a container of a predetermined format containing the plurality of streams, in which each of the plurality of encoders inserts information for associating pictures with each other into encoded image data of corresponding pictures of the plurality of pieces of image data.

(12) The transmission apparatus according to (11), in which the information for associating the pictures with each other is a count-up value updated for each of pictures.

(13) The transmission apparatus according to (11) or (12), in which the plurality of encoders includes: a first encoder that encodes first image data to obtain a first stream; and a second encoder that encodes a third image data obtained on the basis of the first image data and a second image data associated with the first image data to obtain a second stream, and the transmission unit transmits the container of the predetermined format containing the first stream and the second stream.

(14) The transmission apparatus according to (13), in which the second image data is image data of high quality format, the first image data is image data of low quality format obtained by processing the second image data, and the third image data is image data obtained as a difference between the second image data and the first image data.

(15) The transmission apparatus according to (14), in which the second image data is image data of a high dynamic range and the first image data is image data of a normal dynamic range, alternatively, the second image data is image data of UHD resolution and the first image data is image data of HD resolution.

(16) The transmission apparatus according to any of (13) to (15), further including a processing unit configured to process the second image data to obtain the first image data, obtain the third image data on the basis of the first image data and the second image data, and output the first image data and the third image data.

(17) A transmission method including:

a plurality of encoding steps of encoding each of a plurality of pieces of image data to obtain a plurality of streams; and a transmission step of transmitting, by a transmission unit, a container of a predetermined format containing the plurality of streams, in which the encoding step inserts information for associating pictures with each other into encoded image data of corresponding pictures of the plurality of pieces of image data.

(18) A reception apparatus including a reception unit that receives a container of a predetermined format containing a plurality of streams obtained by encoding each of a plurality of pieces of image data, information for associating pictures with each other being inserted into encoded image data of corresponding pictures of the plurality of pieces of image data, and the reception apparatus further including a control unit that controls decode processing of decoding the plurality of streams to obtain the plurality of pieces of image data, controls image data processing using the plurality of pieces of image data, and controls to enable the plurality of pieces of image data used in the image data processing to be synchronous on the basis of the information for associating pictures with each other.

(19) The reception apparatus according to (18), in which the container includes a first stream obtained by encoding the first image data and includes a second stream obtained by encoding third image data obtained on the basis of the first image data and the second image data associated with the first image data, the decode processing decodes the first stream to obtain the first image data and decodes the second stream to obtain the third image data, and the processing using the plurality of pieces of image data obtains the second image data on the basis of the first image data and the third image data.

(20) A reception method including a reception step of receiving, by a reception unit, a container of a predetermined format containing a plurality of streams obtained by encoding each of a plurality of pieces of image data, information for associating pictures with each other being inserted into encoded image data of corresponding pictures of the plurality of pieces of image data, and the reception step further including a control step of controlling decode processing of decoding the plurality of streams to obtain the plurality of pieces of image data, controlling image data processing using the plurality of pieces of image data, and controlling to enable the plurality of pieces of image data used in the image data processing to be synchronous on the basis of the information for associating pictures with each other.

A main feature of present technology is with either encoding a plurality of pieces of image data so as to achieve matching in display timings of corresponding pictures, or with transmitting encoded image data by inserting information for associating pictures with each other into encoded image data of corresponding pictures of the plurality of pieces of image data, thereby enabling synchronous acquisition of the plurality of pieces of image data on the reception side (refer to FIGS. 2, 3, and 4).

REFERENCE SIGNS LIST

10, 20 Transmission-reception system
100 Transmission apparatus
101 Control unit
102 Preprocessor
102a, 102b Processing unit
103, 104 Encoder
103a, 104a Encoding unit
103b, 104b Local decoded buffer
103c, 104c Elementary stream buffer
105 Multiplexer
106 Transmission unit
200A, 200B Reception apparatus
201A, 201B Control unit
202A, 202B Reception unit
203A, 203B Demultiplexer
204A, 204B, 205B Decoder
204a, 205a Decoding unit
204b, 205b Elementary stream buffer
204c, 205c Decoded buffer
205A, 207B Monitor
206B Post processor
206a Inverse processing unit
206b, 206c Post buffer
206d GDI detector
261 Resizing unit
261, 264 Arithmetic operation unit
263 Pixel level converter 300 Transmission apparatus
301 Control unit
302-1 to 302-N Encoder
303 Multiplexer
304 Transmission unit
400 Reception apparatus
401 Control unit
402 Reception unit
403 Demultiplexer
404-1 to 404-N Decoder
405 Synchronization processing unit
406-1 to 406-N Monitor

The invention claimed is:

1. A transmission apparatus comprising:
a plurality of encoders configured to encode a plurality of pieces of image data to obtain a plurality of streams; and
transmission circuitry configured to transmit a container of a predetermined format containing the plurality of streams, wherein
the plurality of encoders is configured to encode the plurality of pieces of image data so as to achieve matching in display timings of corresponding pictures based on one of a hypothetical reference decoder (HRD) parameter, a picture encode count value reset by an intra-picture, and a common HRD parameter, and
a first encoder of the plurality of encoders is configured to (i) supply the HRD parameter or the picture encode count value reset by the intra-picture to a second encoder of the plurality of encoders, or (ii) receive the common HRD parameter that is externally supplied to the plurality of encoders, to match the display timings of the corresponding pictures,
wherein the same one of the HRD parameter, the picture encode count value, and the common HRD parameter is provided to the plurality of encoders.

2. The transmission apparatus according to claim 1, wherein
the first encoder of the plurality of encoders is configured to supply the HRD parameter or the picture encode count value reset by the intra-picture to the second encoder of the plurality of encoders.

3. The transmission apparatus according to claim 1, wherein
one of the first encoder and the second encoder is configured to encode first image data to obtain a first stream; and
the other one of the first encoder and the second encoder is configured to encode third image data obtained based on the first image data and second image data associated with the first image data to obtain a second stream, and
the transmission circuitry is configured to transmit the container of the predetermined format containing the first stream and the second stream.

4. The transmission apparatus according to claim 3, wherein
the second image data is image data of high quality format,
the first image data is image data of low quality format obtained by processing the second image data, and
the third image data is image data obtained as a difference between the second image data and the first image data.

5. The transmission apparatus according to claim 4, wherein
the second image data is image data of a high dynamic range and the first image data is image data of a normal dynamic range, or alternatively, the second image data is image data of ultra-high definition (UHD) resolution and the first image data is image data of high-definition (HD) resolution.

6. The transmission apparatus according to claim 3, further comprising
processing circuitry configured to
process the second image data to obtain the first image data,
obtain the third image data based on the first image data and the second image data, and
output the first image data and the third image data.

7. The transmission apparatus according to claim 1, wherein
the first encoder of the plurality of encoders is configured to receive the common HRD parameter that is externally supplied to the plurality of encoders, to match the display timings of the corresponding pictures.

8. A reception apparatus comprising
reception circuitry configured to receive a container of a predetermined format including a plurality of streams obtained by encoding each of a plurality of pieces of image data, the plurality of pieces of image data being encoded by a plurality of encoders so as to achieve matching in display timings of corresponding pictures based on one of a hypothetical reference decoder (HRD) parameter, a picture encode count value reset by an intra-picture, and a common HRD parameter; and
processing circuitry configured to
control decode processing of decoding the plurality of streams to obtain the plurality of pieces of image data, and
control processing using the plurality of pieces of image data, wherein
(i) the HRD parameter or the picture encode count value reset by the intra-picture is supplied by a first encoder of the plurality of encoders to a second encoder of the plurality of encoders, or (ii) a common HRD parameter is externally supplied to the plurality of encoders, to match the display timings of the corresponding pictures, and
the same one of the HRD parameter, the picture encode count value, and the common HRD parameter is provided to the plurality of encoders.

9. The reception apparatus according to claim 8, wherein
the container includes a first stream obtained by encoding first image data and includes a second stream obtained by encoding third image data obtained based on the first image data and second image data associated with the first image data,
the decode processing decodes the first stream to obtain the first image data and decodes the second stream to obtain the third image data, and
the processing using the plurality of pieces of image data obtains the second image data based on the first image data and the third image data.

10. A transmission apparatus comprising:
a plurality of encoders configured to encode a plurality of pieces of image data to obtain a plurality of streams; and
transmission circuitry configured to transmit a container of a predetermined format containing the plurality of streams, wherein
each of the plurality of encoders inserts counter information for associating pictures with each other into encoded image data of corresponding pictures of the plurality of pieces of image data, and
the plurality of encoders inserts the same counter information for associating pictures into the corresponding pictures of the plurality of streams.

11. The transmission apparatus according to claim 10, wherein the counter information for associating the pictures with each other is a count-up value updated for each set of the corresponding pictures.

12. The transmission apparatus according to claim 10, wherein
the plurality of encoders includes:
a first encoder configured to encode first image data to obtain a first stream; and
a second encoder configured to encode third image data obtained based on the first image data and second image data associated with the first image data to obtain a second stream, and
the transmission circuitry is configured to transmit the container of the predetermined format containing the first stream and the second stream.

13. The transmission apparatus according to claim 12, wherein
the second image data is image data of high quality format,
the first image data is image data of low quality format obtained by processing the second image data, and
the third image data is image data obtained as a difference between the second image data and the first image data.

14. The transmission apparatus according to claim 13, wherein
the second image data is image data of a high dynamic range and the first image data is image data of a normal dynamic range, or alternatively, the second image data is image data of ultra-high definition (UHD) resolution and the first image data is image data of high-definition (HD) resolution.

15. The transmission apparatus according to claim 12, further comprising:
processing circuitry configured to
process the second image data to obtain the first image data,
obtain the third image data based on the first image data and the second image data, and
output the first image data and the third image data.

16. A reception apparatus comprising
reception circuitry configured to receive a container of a predetermined format containing a plurality of streams obtained by encoding each of a plurality of pieces of image data, counter information for associating pictures with each other being inserted into encoded image data of corresponding pictures of the plurality of pieces of image data; and
processing circuitry configured to
control decode processing of decoding the plurality of streams to obtain the plurality of pieces of image data,
control image data processing using the plurality of pieces of image data, and
control to enable the plurality of pieces of image data used in the image data processing to be synchronous based on the counter information for associating pictures with each other, wherein
the same counter information for associating pictures is inserted by a plurality of encoders into the corresponding pictures of the plurality of streams.

17. The reception apparatus according to claim 16, wherein
the container includes a first stream obtained by encoding first image data and includes a second stream obtained by encoding third image data obtained based on the first image data and second image data associated with the first image data,
the decode processing decodes the first stream to obtain the first image data and decodes the second stream to obtain the third image data, and
the processing using the plurality of pieces of image data obtains the second image data based on the first image data and the third image data.

18. The reception apparatus according to claim 16, wherein the counter information for associating the pictures with each other is a count-up value updated for each set of the corresponding pictures.

* * * * *